US009420512B2

(12) United States Patent
Kodali et al.

(10) Patent No.: US 9,420,512 B2
(45) Date of Patent: Aug. 16, 2016

(54) HANDLING UPLINK POWER LIMITED SCENARIOS

(71) Applicant: Apple Inc., Cupertino, CA (US)

(72) Inventors: Sree Ram Kodali, Sunnyvale, CA (US); Giri Prassad Deivasigamani, San Jose, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 14/157,447

(22) Filed: Jan. 16, 2014

(65) Prior Publication Data

US 2014/0200003 A1 Jul. 17, 2014

Related U.S. Application Data

(60) Provisional application No. 61/753,864, filed on Jan. 17, 2013, provisional application No. 61/754,503, filed on Jan. 18, 2013.

(51) Int. Cl.
*H04W 36/30* (2009.01)
*H04W 52/14* (2009.01)
*H04W 52/36* (2009.01)

(52) U.S. Cl.
CPC ............ *H04W 36/30* (2013.01); *H04W 52/146* (2013.01); *H04W 52/367* (2013.01); *Y02B 60/50* (2013.01)

(58) Field of Classification Search
CPC ...... H04W 52/44; H04W 36/30; H04W 36/14
See application file for complete search history.

(56) References Cited

U.S. PATENT DOCUMENTS

| 5,862,489 A * | 1/1999 | Aalto ............................ 455/522 |
| 2013/0039232 A1 * | 2/2013 | Kim ........................ H04W 8/22 370/280 |
| 2013/0310045 A1 | 11/2013 | Yan et al. |
| 2014/0038588 A1 * | 2/2014 | Ljung ............... H04W 52/0216 455/422.1 |
| 2014/0141769 A1 * | 5/2014 | Brisebois et al. ............. 455/424 |
| 2014/0148211 A1 * | 5/2014 | Mountford ............ H04W 52/10 455/522 |

FOREIGN PATENT DOCUMENTS

| WO | 2012150888 A1 | 11/2012 |
| WO | 2013009054 A2 | 1/2013 |
| WO | 2013051993 A1 | 4/2013 |

* cited by examiner

*Primary Examiner* — Myron K Wyche
(74) *Attorney, Agent, or Firm* — Downey Brand LLP

(57) ABSTRACT

A method for reducing power consumption by a wireless communication device is disclosed. The method can include the wireless communication device determining that the device is experiencing an uplink power limited condition. In an instance in which the connection to the serving network was established only for a signaling purpose, the method can further include the wireless communication device sending a measurement report including an actual measured downlink signal quality value for the serving network in response to the uplink power limited condition. However, if the connection to the serving network was not established only for a signaling purpose, the method can include the wireless communication device sending a measurement report including a modified downlink signal quality value for the serving network to trigger a handover in response to the uplink power limited condition.

23 Claims, 15 Drawing Sheets

HANDLING UPLINK POWER LIMITED SCENARIOS

CROSS-REFERENCE TO RELATED APPLICATION

This application claims the benefit of priority from both U.S. Provisional Patent Application No. 61/753,864, filed on Jan. 17, 2013, and U.S. Provisional Patent Application No. 61/754,503, filed on Jan. 18, 2013, each of which is hereby incorporated herein by reference in its entity.

FIELD

The described embodiments relate generally to wireless communications. More particularly, the present embodiments relate to handling uplink power limited scenarios.

BACKGROUND

Wireless communication devices can be configured with a power class defining a maximum uplink transmission power capability of the device. For example, UEs (user equipment devices) categorized as power class 3 UEs on a Long Term Evolution (LTE) network can have a maximum uplink transmission power capability of +23 dBm (decibels per milliwatt). However, due to factors, such as Federal Communications Commission (FCC) restrictions, some devices often transmit at a power lower than the maximum uplink transmission power capability. For example, FCC specific absorption rate (SAR) regulations cap the maximum transmission of some devices when they are positioned proximate to a human body to limit radiation emissions. This situation can result in an uplink power limited scenario.

When a wireless communication device experiences an uplink power limited scenario, it can reduce an effective coverage area of a serving cell. In this regard, a cell can be configured with an effective coverage radius on the basis of a device's power class. Thus in an uplink power limited scenario, a wireless communication device can be within sufficient range of the serving base station to be able to successfully receive and decode downlink messages sent to the device, but, due to transmission power limitations, may not be able to successfully send uplink messages to the serving base station. In this regard, the serving network is generally not aware when a wireless communication device will be uplink power limited due to SAR regulations. As such, radio link failures can occur. Moreover, as an uplink power limited device experiences radio link failures and retransmits data, the network can suffer from interference that can be caused by retransmission of signaling that failed to reach the serving cell due to uplink power limitations. Further, retransmissions can result in additional radiation exposure from radio frequency emissions.

Measurement reports triggered on the basis of downlink power can be used to trigger a handover decision by a serving network. However, in the case of an uplink power limited scenario in which downlink power is within acceptable parameters configured on the basis of a device's power class but the device is experiencing an uplink power limited condition limiting the effective coverage area of the cell, the serving network can be unaware of the device's transmission power limited condition. As such, the serving network can assume that the wireless communication device remains within the coverage area of the serving cell even though the wireless communication device may be outside of the effective coverage range of the cell and unable to successfully transmit uplink messages to the serving base station. Some wireless communication devices manipulate a downlink signal quality value reported in a measurement report in an uplink power limited condition to avoid radio link failures, call drops, data stalls, retransmissions, and other issues that can result from an uplink power limited condition. However, in some instances, reporting a manipulated signal quality in an uplink power limited condition can result in ping pong reselections between networks, thus increasing network overhead and device power consumption through cyclical reselection between cells.

SUMMARY

Some example embodiments disclosed herein facilitate handling uplink power limited scenarios so as to avoid ping pong reselections by devices having transmission power caps, such as due to SAR regulations and/or other regulations restricting radio frequency emissions by a wireless communication device when the wireless communication device is within proximity of a human body. For example, in some embodiments, if a connection between a wireless communication device and a serving cell was established only for a signaling purpose, the wireless communication device can report an actually measured downlink signal quality even if it is experiencing an uplink power limited condition. However, if the wireless communication device of such example embodiments established the connection for a purpose other than and/or a purpose in addition to signaling, the device can report a modified downlink signal quality value for the serving cell in response to an uplink power limited condition to trigger a handover to another cell to avoid a radio link. Accordingly, by selectively modifying the reported downlink signal quality value in response to an uplink power limited condition based at least in part on the purpose for which a connection was established, the wireless communication device of such example embodiments can avoid radio link failures that can lead to call drops and/or other interruptions to user experience while also avoiding ping pong reselection that can result from reporting modified signal quality for a connection established only for a signaling purpose. Additional embodiments disclosed herein provide further solutions that can be performed by a wireless communication device and/or by a network entity to address uplink power limited scenarios and avoid ping pong reselections by a wireless communication device experiencing an uplink power limited condition.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
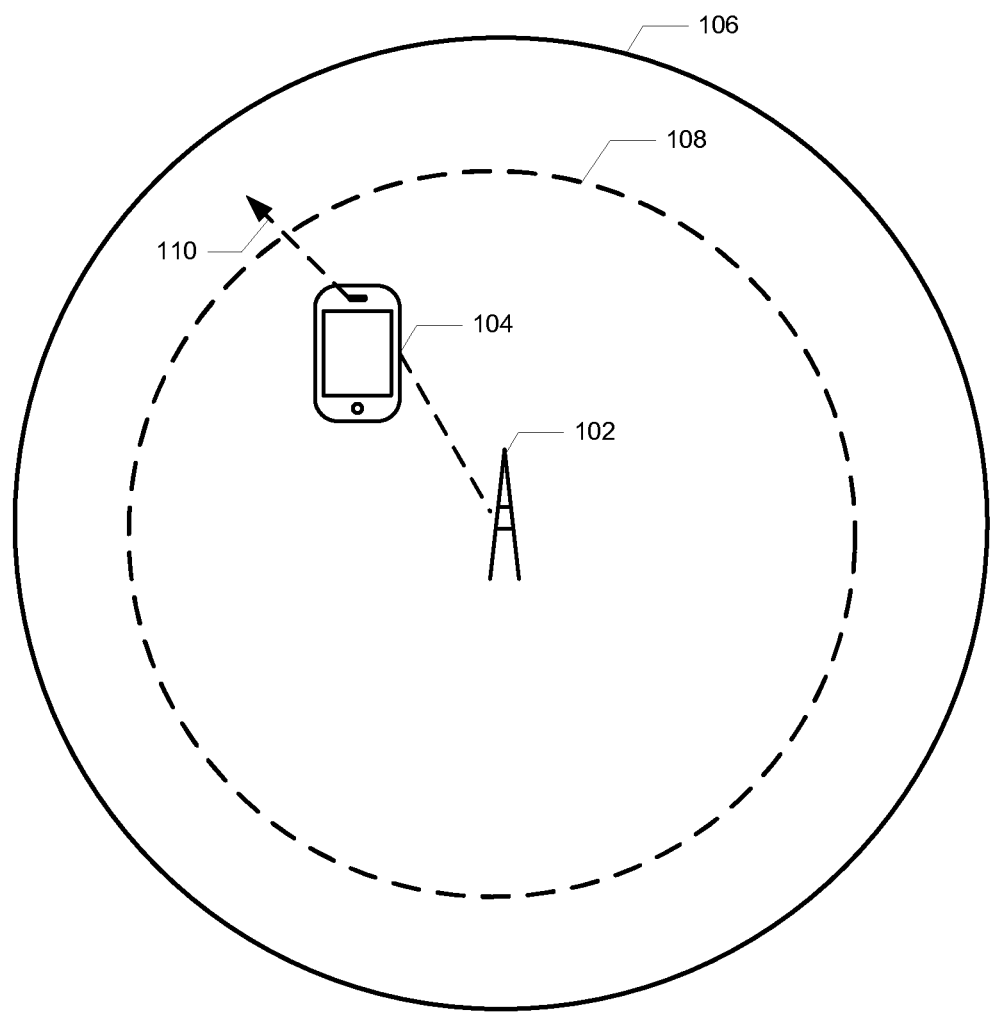
FIG. 1 illustrates limitation of an effective serving cell coverage area in an uplink power limited scenario.

FIG. 1 illustrates an example uplink power limited scenario that can be addressed by some example embodiments. In FIG. 1, a serving base station 102 can provide access to a cellular network to a wireless communication device 104. The base station 102 can, for example, comprise any base station, base transceiver station (BTS), node B, evolved node B (eNB), or other cellular base station in various embodiments. In this regard, the type of base station implemented by base station 102 can vary depending on a radio access technology (RAT) used by the base station 102. For example, in embodiments in which the base station 102 implements a Long Term Evolution (LTE) RAT, such as LTE, LTE-Advanced (LTE-A), or the like, the base station 102 can be an eNB. Wireless communication device 104 can, for example, be a smart phone device, tablet computing device, laptop computer, or other computing device that can be configured to operate on a cellular network.

The serving base station 102 can serve a cell having a coverage area 106. The coverage area 106 can, for example, correlate to a power class of the wireless communication device 104. In this regard, the coverage area 106 can define an area in which wireless communication device 104 can both successfully receive and decode downlink messages that can be sent by the serving base station 102 and can successfully transmit uplink messages to the serving base station 102 when using its maximum transmission power in accordance with its power class. Thus, for example, if the wireless communication device 104 is an LTE power class 3 UE having a 23 dBm transmission power, coverage area 106 can define an area in which uplink transmissions sent by the wireless communication device 104 can successfully reach the serving base station 102. In some example embodiments, the coverage area 106 can be defined as an area in which at least a threshold block error rate (BLER) can be satisfied for a given device power class, assuming uplink transmissions can occur at up to a transmission power associated with the device power class.

Due to various conditions, the wireless communication device 104 can be power limited to a transmission power less than its power class. In this regard, there can be an imbalance between a downlink transmission power of the serving base station 102 that can be configured based on the coverage area 106 and the device power class and the actual maximum transmission power of the wireless communication device 104. For example, the wireless communication device 104 can comply with a regulation, such as a SAR regulation, that can restrict radio frequency emissions by the wireless communication device when the wireless communication device is within proximity of a human body. This proximity can, for example, be detected via a proximity sensor that can be embodied on a wireless communication device in accordance with some example embodiments.

For purposes of example, the wireless communication device 104 can be power limited to a transmission power of 15 dBm due to the wireless communication device 104 being within sufficient proximity of a human body to trigger an uplink transmission power cap. This transmission power limitation of the wireless communication device 104 can limit the effective range of the serving cell to an area 108, which can be smaller than the area 106. In this regard, while the wireless communication device 104 may be able to successfully receive and decode downlink messages throughout the area 106 in an uplink power limited scenario, uplink messages sent by the wireless communication device 104 may not successfully reach the serving base station 102 if the wireless communication device 104 moves outside of the area 108. Thus, if the wireless communication device 104 is traveling in a direction noted by reference 110, an imbalanced link budget condition can result in which calls can be dropped. In this regard, the wireless communication device 104 can remain on the serving cell due to traditional handover measurements not being triggered as downlink power measurements can be satisfactory. However, the wireless communication device 104 can be unable to successfully send uplink messages to the serving base station 102 due to its uplink power limited condition, which can result in uplink radio link failure and dropped calls.

Some wireless communication devices address such uplink power limited conditions by reporting a modified (e.g., one other than actually measured) downlink signal quality in a measurement report so as to trigger a preemptive handover, such as an inter-frequency handover or an inter-radio access technology (iRAT) handover, before suffering from uplink transmission failure that can result if the wireless communication device 104 travels outside of the area 108. However, indiscriminate reporting of a modified downlink signal quality by a device experiencing an uplink power limited condition can result in ping pong reselections between networks. For example, a device with an active call (e.g., a voice call, data call, and/or other call session) camped on a Long Term Evolution (LTE) network can report a lower than actually reference signal received power (RSRP) level than the actually measured RSRP level, the LTE network may redirect the device through an iRAT handover to another, such as a Wideband Code Division Multiple Access (WCDMA) network.

After call release, the device can enter idle mode on the WCDMA network. As LTE may be a higher priority radio access technology (RAT) than WCDMA, the device can reselect to LTE due to the actual measured RSRP. However, many devices cannot sense distance between the human body and the device transmission (Tx) antenna when in idle mode, so the device may reselect to LTE even though its uplink transmission power may still be capped below the maximum transmission power associated with the power class of the device due to proximity of the device to a user. The device can move to connected mode on the LTE network for a signaling purpose and send a tracking area update (TAU) request to the LTE network. If the device is still transmission power capped due to proximity to a human body, such as if the device is being held close to a human head, the device can again report a modified downlink signal quality to the LTE network and can again be redirected to the WCDMA network, as the device can sense proximity to a human body when in connected mode. For example, an "actual" measured RSRP can be −110 dBm. If the re-direction threshold from LTE to WCDMA is −111 dBm, the device can add an offset of 5 dBm and report the manipulated RSRP of −115 dBm to the LTE network to trigger redirection to WCDMA. This process can repeat, and the device can perform ping pong reselections between the LTE and WCDMA networks until the device is no longer in a power limited condition.

Some example embodiments disclosed herein facilitate handling uplink power limited scenarios so as to avoid such ping pong reselections. For example, in some embodiments, if a connection between a wireless communication device and a serving cell was established only for a signaling purpose, the wireless communication device can report an actually measured downlink signal quality even if it is experiencing an uplink power limited condition. However, if the wireless communication device of such example embodiments established the connection for a purpose other than and/or a purpose in addition to signaling, the device can report a modified downlink signal quality value for the serving cell in response to an uplink power limited condition to trigger a handover to another cell to avoid a radio link. Accordingly, by selectively modifying the reported downlink signal quality value in response to an uplink power limited condition based at least in part on the purpose for which a connection was established, the wireless communication device of such example embodiments can avoid radio link failures that can lead to call drops and/or other interruptions to user experience while also avoiding ping pong reselection that can result from reporting modified signal quality for a connection established only for a signaling purpose. Additional embodiments disclosed herein provide further solutions that can be performed by a wireless communication device and/or by a network entity to address uplink power limited scenarios and avoid ping pong reselections by a wireless communication device experiencing an uplink power limited condition.

These and other embodiments are discussed below with reference to FIGS. 2-15. However, those skilled in the art will readily appreciate that the detailed description given herein with respect to these Figures is for explanatory purposes only and should not be construed as limiting.

Figure 2:
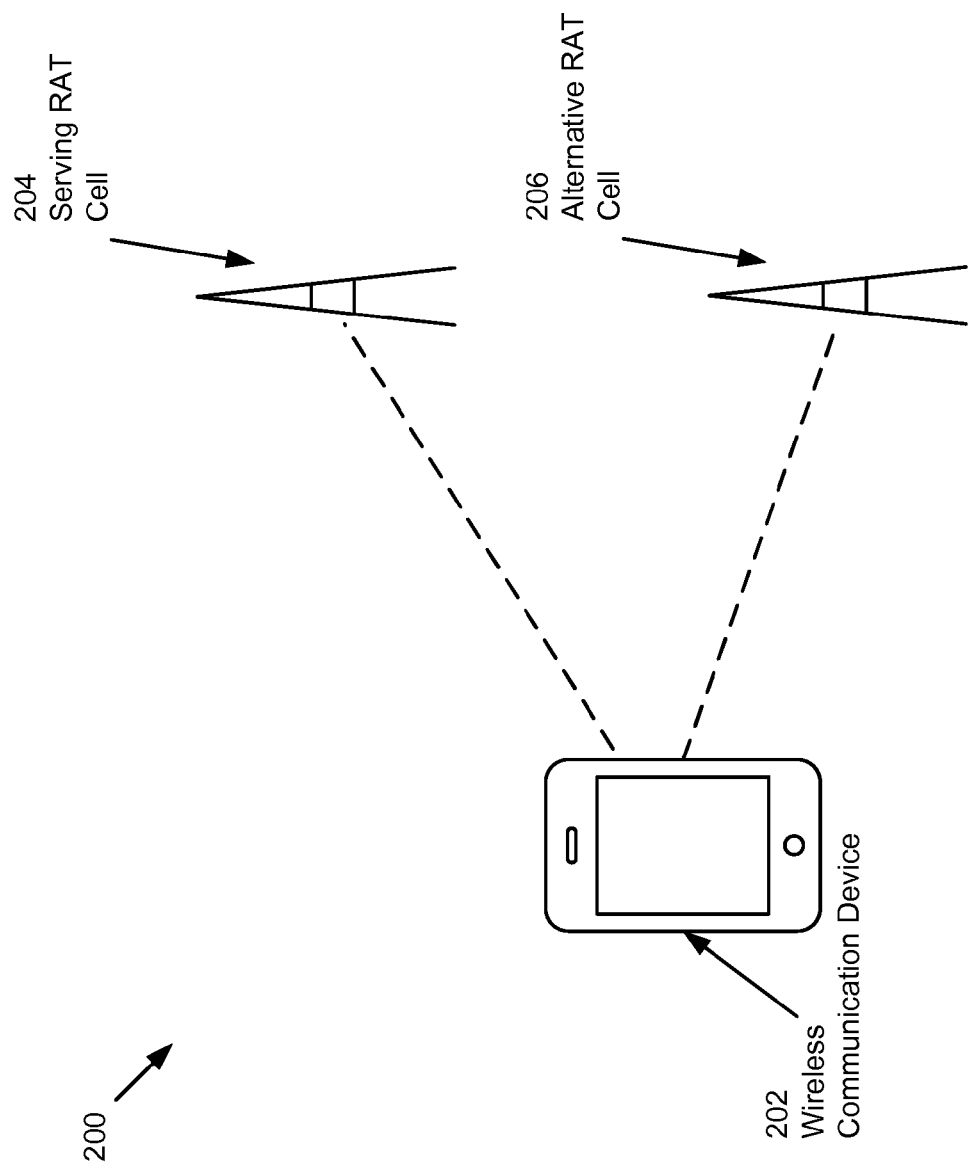
FIG. 2 illustrates a wireless communication system in accordance with some example embodiments.

FIG. 2 illustrates a wireless communication system 200 in accordance with some example embodiments. The system 200 can include a wireless communication device 202. The wireless communication device 202 can be any computing device that can be configured to communicate over a cellular network, including, for example, a smart phone or other cellular phone, a tablet computing device, a laptop computing device configured to communicate over a cellular network, and/or other computing device that can be configured to connect to a cellular network. In some example embodiments, such as some embodiments in which the wireless communication device 202 is configured to access an LTE network, the wireless communication device 202 can be referred to as user equipment (UE).

In some example embodiments, the wireless communication device 202 can be subject to regulations restricting radio frequency emissions by the wireless communication device 202 when the wireless communication device is within proximity of a human body. In this regard, the wireless communication device 202 can include a proximity sensor, such as proximity sensor 418 illustrated in and discussed below with respect to FIG. 4, which can be configured to detect when the wireless communication device 202 is within proximity of a human body, such as if the wireless communication device 202 is held close to a user's head to enable the user to talk into the device and participate in a voice call. By way of non-limiting example, the wireless communication device 202 can be subject to SAR regulations, such as can be issued by the United States Federal Communications Commission (FCC), The European Committee for Electrotechnical Standardization (CENELEC), and/or other government or other regulatory body that can regulate uplink power transmission caps to control radio frequency emissions by a wireless communication device when the device is within proximity of a human.

The wireless communication device 202 can be camped on a serving RAT cell 204 of a serving network. The serving RAT cell 204 can have an associated serving base station, which can be embodied as any of a variety of cellular base stations, including, by way of non-limiting example, a base station, BTS, node B, eNB, and/or the like, depending on a type of RAT implemented by the serving network and serving RAT cell 204. In this regard, the serving network (and thus the serving RAT cell 204) can implement any of a variety of present or future developed cellular RATs. For example, in some embodiments, the serving RAT cell 204 can implement a fourth generation (4G) RAT, such as an LTE RAT, including LTE, LTE-Advanced (LTE-A), and/or other present or future developed LTE RAT. In some example embodiments, the serving RAT cell 204 can implement a legacy RAT having a circuit switched (CS) domain, such as a third generation (3G) RAT or second generation (2G) RAT. For example, in some embodiments in which the serving RAT cell 204 implements a 3G RAT, the 3G RAT can, by way of non-limiting example, be a Universal Mobile Telecommunications System (UMTS) RAT, such as WCDMA, code division multiple access (CDMA), or Time Division Synchronous Code Division Multiple Access (TD-SCDMA); a CDMA2000 RAT (e.g., 1×RTT), high rate packet data (HRPD), 1×/EV-DO, and/or other RAT standardized by 3GPP2; and/or other 3G RAT. As a further example, in some embodiments in which the serving RAT cell 204 implements a 2G RAT, the 2G RAT can, by way of non-limiting example, be a global system for mobile communications (GSM) RAT. It will be appreciated that the serving RAT cell 204 can additionally or alternatively implement one or more other present or future developed RATs, such as various fifth generation (5G) RATs currently in development, within the scope of the disclosure.

The wireless communication device 202 can be within range of one or more further cells (e.g., neighbor cells), including, for example, one or more inter-frequency cells that can use the same RAT as the serving RAT cell 204 and/or one or more cells that can use an alternative RAT different from the RAT used by the serving RAT cell 204. The wireless communication device 202 can transition between the serving RAT cell 204 and a neighbor cell, such as through redirection by the serving and/or other handover procedure. For example, the wireless communication device 202 can be redirected form the serving RAT cell 204 to a neighbor cell and/or vice versa based on measurement reports that can be sent by the wireless communication device 202.

In the example illustration of FIG. 2, the wireless communication device 202 can be within range of an alternative RAT cell 206. The alternative RAT cell 206 can have an associated base station, which can be embodied as any of a variety of cellular base stations, including, by way of non-limiting example, a base station, BTS, node B, eNB, and/or the like, depending on a type of RAT implemented by the alternative RAT cell 206. The alternative RAT cell 206 can be on a network using a different RAT than the RAT used by the serving RAT cell 204. As such, the wireless communication device 202 can be handed over between the serving RAT cell 204 and alternative RAT cell 206 through an iRAT handover procedure. For example, in some embodiments in which the serving RAT cell 204 implements an LTE RAT, the alternative RAT cell 206 can implement a legacy RAT having a CS domain, such as a 2G RAT or a 3G RAT. It will be appreciated, however, that the alternative RAT cell 206 can implement any present or future developed cellular RATs. For example, in some embodiments, the alternative RAT cell 206 can implement a 4G RAT, such as an LTE RAT, including LTE, LTE-A, and/or other present or future developed LTE RAT. In some example embodiments, the alternative RAT cell 206 can implement a 3G RAT, such as a UMTS RAT, such as WCDMA, CDMA, or TD-SCDMA; a CDMA2000 RAT (e.g., 1×RTT), HRPD, 1×/EV-DO, and/or other RAT standardized by 3GPP2; and/or other 3G RAT. As a further example, in some embodiments, the alternative RAT cell 206 can implement a GSM RAT and/or other 2G RAT. It will be appreciated that the alternative RAT cell 206 can additionally or alternatively implement one or more other present or future developed RATs, such as various fifth generation (5G) RATs currently in development, within the scope of the disclosure.

The wireless communication device 202 can accordingly be handed over between the serving RAT cell 204 and alternative RAT cell 206 through an iRAT handover procedure. As further described herein below, some example embodiments can be applied to avoid ping pong reselections (e.g., iRAT handovers) between the serving RAT cell 204 and alternative RAT cell 206 by a wireless communication device 202 experiencing an uplink power limited condition. It will be appreciated, however, that some example embodiments can also be applied mutatis mutandis within the context of inter-frequency handovers and/or other handovers between cells using the same RAT within the scope of the disclosure.

Figure 3:
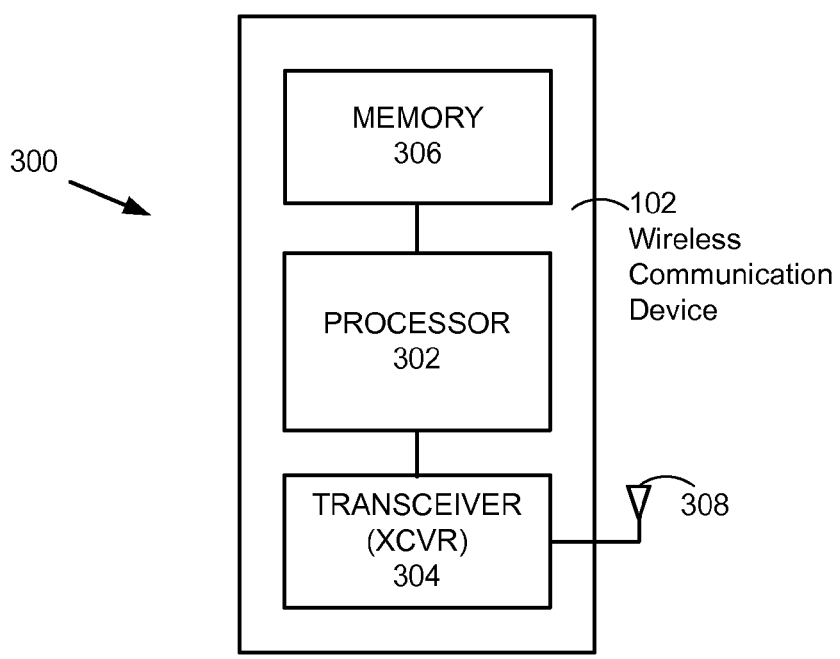
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. The apparatus 300 can include a processor 302 coupled with memory 306 and also coupled with a wireless transceiver 304. Processor 302 can be configured to read, write and execute processor instructions stored in memory 306. Processor 302 can also be configured to control wireless transceiver 304. Wireless transceiver 304 can be coupled to an antenna 308. In some embodiments, wireless transceiver 304, in combination with antenna 308 can be configured to enable the wireless communication device 202 to connect to one or more wireless networks, such as via serving RAT cell 204 and/or alternative RAT cell 206. It will be appreciated that the processor 302 can be configured through hardware, software (e.g., software that can be stored in memory 306), firmware (e.g., firmware that can be stored in memory 306), and/or some combination thereof to control one or more operations that can be performed by a wireless communication device 202 in accordance with various example embodiments.

Figure 4:
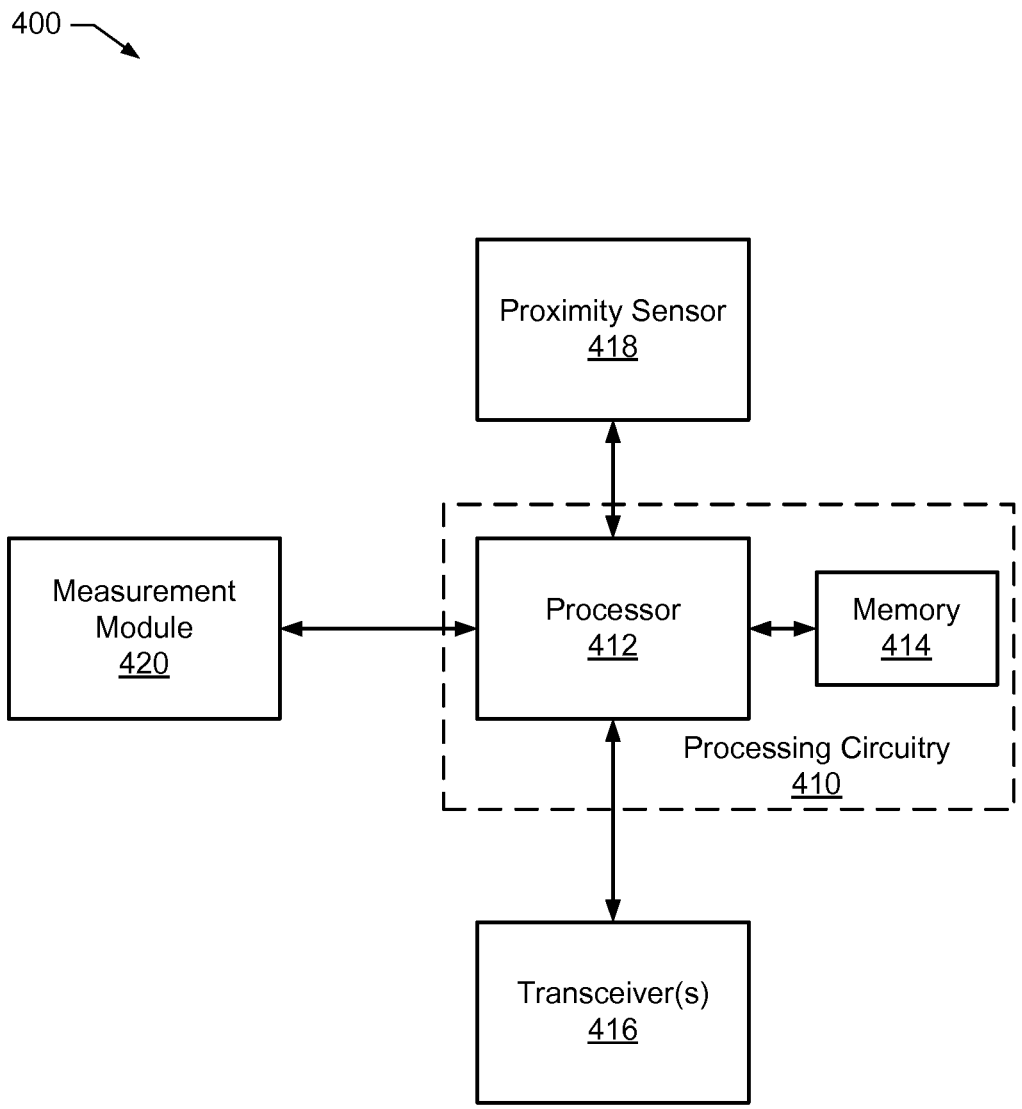
FIG. 4 illustrates another block diagram of an apparatus that can be implemented on a wireless communication device in accordance with some example embodiments.

FIG. 4 illustrates a block diagram of an apparatus 400, which is another example apparatus that can be implemented on a wireless communication device 202 in accordance with some example embodiments. When implemented on a computing device, such as wireless communication device 202, apparatus 400 can provide an apparatus configured to enable the computing device to operate within the system 200 in accordance with one or more example embodiments. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the wireless communication device 202 in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, which can each include one or more chips. The processing circuitry 410 and/or one or more further components of the apparatus 400 can therefore, in some instances, be configured to implement an embodiment on a chipset(s). In some example embodiments in which one or more components of the apparatus 400 are embodied as a chipset, the chipset can be capable of enabling a computing device to operate in the system 200 when implemented on or otherwise operably coupled to the computing device. Thus, for example, one or more components of the apparatus 400 can provide a cellular baseband chipset, which can enable a computing device, such as wireless communication device 202, to operate within a cellular network.

In some example embodiments, the processing circuitry 410 can include a processor 412 and, in some embodiments, such as that illustrated in FIG. 4, can further include memory 414. The processing circuitry 410 can be in communication with or otherwise control transceiver(s) 416, proximity sensor 418, and/or measurement module 420.

The processor 412 can be embodied in a variety of forms. For example, the processor 412 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. The plurality of processors can be in operative communication with each other and can be collectively configured to perform one or more functionalities of the wireless communication device 202 as described herein. The processor 412 of some example embodiments can be an embodiment of the processor 302. In some example embodiments, the processor 412 can be configured to execute instructions that can be stored in the memory 414 or that can be otherwise accessible to the processor 412. As such, whether configured by hardware or by a combination of hardware and software, the processor 412 can be capable of performing operations according to various embodiments while configured accordingly.

In some example embodiments, the memory 414 can include one or more memory devices. Memory 414 can include fixed and/or removable memory devices. In some embodiments, the memory 414 can provide a non-transitory computer-readable storage medium that can store computer program instructions that can be executed by the processor 412. In this regard, the memory 414 can be configured to store information, data, applications, instructions and/or the like for enabling the apparatus 400 to carry out various functions in accordance with one or more example embodiments. The memory 414 of some example embodiments can be an embodiment of the memory 306. In some embodiments, the memory 414 can be in communication with one or more of the processor 412, transceiver(s) 416, proximity sensor 418, or measurement module 420 via a bus (or buses) for passing information among components of the apparatus 400.

The apparatus 400 can further include one or more transceivers 416. The transceiver(s) 416 can enable the apparatus 400 to send wireless signals to and receive signals from one or more cellular networks. As such, the transceiver(s) 416 can be configured to support any type of cellular RAT that can be implemented by the serving RAT cell 204 and/or alternative RAT cell 206. In some example embodiments, the transceiver(s) 416 can comprise an embodiment of the transceiver 304.

The apparatus 400 can additionally include the proximity sensor 418. The proximity sensor 418 can be configured to sense proximity between the wireless communication device 202 and another object, such as a human body. For example, in some embodiments, the proximity sensor 418 can be configured to sense when the wireless communication device 202 is positioned within sufficient proximity of a human body to trigger an uplink transmission power cap (e.g., in compliance with a SAR regulation and/or other regulation that can apply to the wireless communication device 202). The proximity sensor 418 of such example embodiments can be configured provide output indicating that the wireless communication device 202 is within proximity to a human body when proximity to the human body is detected. As such, the wireless communication device 202 of some example embodiments can selectively cap an uplink transmission power based on output of the proximity sensor 418. The proximity sensor 418 can be in communication with one or more of the processor 412, memory 414, transceiver(s) 416, or measurement module 420 via a bus (or buses) for passing information among components of the apparatus 400.

In some example embodiments, one or more elements of the apparatus 400, such as the processing circuitry 410 and/or measurement module 420, can be configured to read and/or otherwise access output of the proximity sensor 418 and to determine whether the wireless communication 202 is experiencing an uplink power limited condition based at least in part on the output of the proximity sensor 418. For, if the proximity sensor output indicates that a human body is within proximity of the wireless communication device 202, it can be determined that the wireless communication 202 is experiencing an uplink power limited condition. If, however, the proximity sensor output does not indicate that a human body is within proximity of the wireless communication device 202, it can be determined that the wireless communication 202 is not experiencing an uplink power limited condition.

The apparatus 400 can further include measurement module 420. The measurement module 420 can be embodied as various means, such as circuitry, hardware, a computer program product comprising a computer readable medium (for example, the memory 414) storing computer readable program instructions executable by a processing device (for example, the processor 412), or some combination thereof. In some embodiments, the processor 412 (or the processing circuitry 410) can include, or otherwise control the measurement module 420. The measurement module 420 can be configured in some example embodiments to determine when the wireless communication device 202 is experiencing an uplink power limited condition, selectively generate and send measurement reports including modified downlink signal quality values, and/or otherwise perform operations in accordance with one or more example embodiments described further herein below. For example, the measurement module 420 can be configured to perform one or more operations in accordance with one or more of the methods illustrated in and described herein below with respect to FIGS. 6-7 and 10-15.

Figure 5:
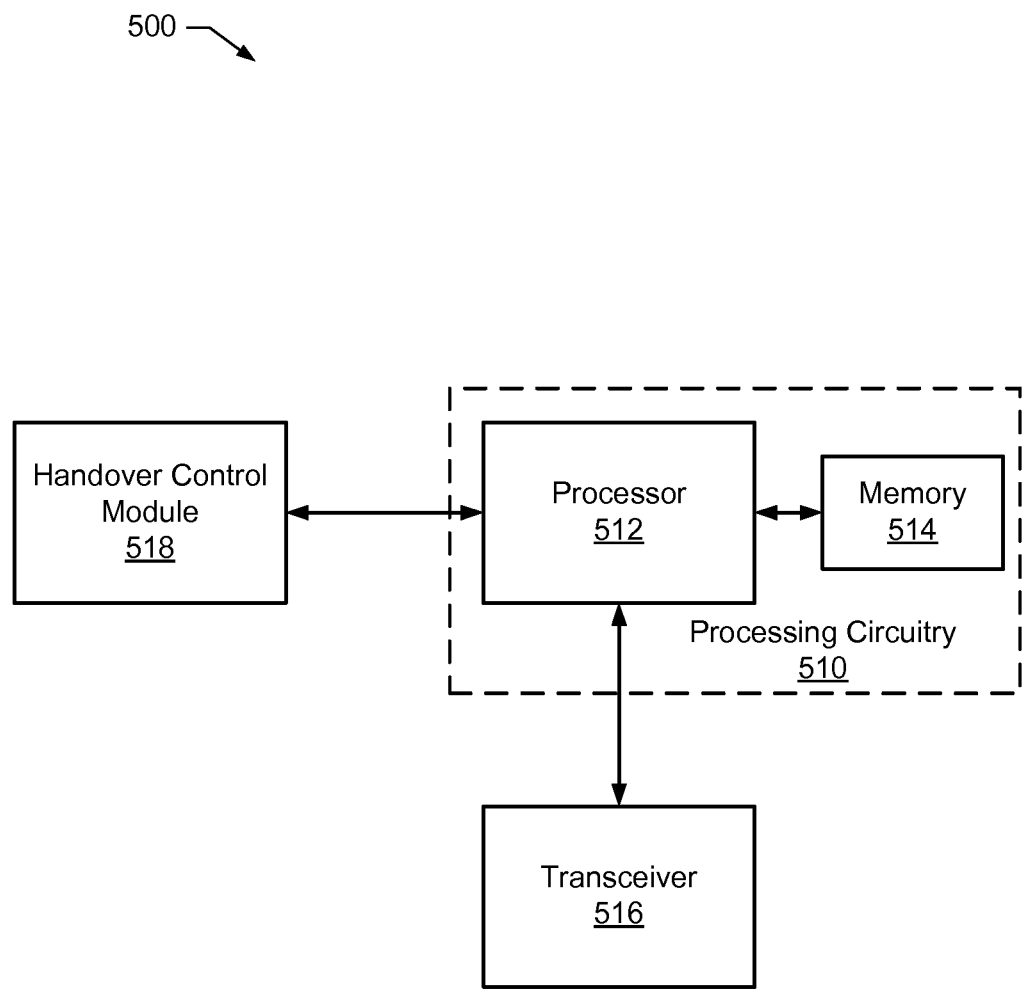
FIG. 5 illustrates a block diagram of an apparatus that can be implemented on a base station and/or other network entity in accordance with some example embodiments.

FIG. 5 illustrates a block diagram of an apparatus 500 that can be implemented on a base station and/or other network entity, such as can be associated with the serving RAT cell 204 and/or alternative RAT cell 206, in accordance with some example embodiments. It will be appreciated that the components, devices or elements illustrated in and described with respect to FIG. 5 below may not be mandatory and thus some may be omitted in certain embodiments. Additionally, some embodiments can include further or different components, devices or elements beyond those illustrated in and described with respect to FIG. 5.

In some example embodiments, the apparatus 500 can include processing circuitry 510 that is configurable to perform actions in accordance with one or more example embodiments disclosed herein. In this regard, the processing circuitry 510 can be configured to perform and/or control performance of one or more functionalities of the apparatus 500 in accordance with various example embodiments, and thus can provide means for performing functionalities of a serving base station and/or other network entity of a serving network in accordance with various example embodiments. The processing circuitry 510 can be configured to perform data processing, application execution and/or other processing and management services according to one or more example embodiments.

In some embodiments, the apparatus 500 or a portion(s) or component(s) thereof, such as the processing circuitry 510, can include one or more chipsets, which can each include one or more chips. The processing circuitry 510 and/or one or more further components of the apparatus 500 can therefore, in some instances, be configured to implement an embodiment on a chipset(s).

In some example embodiments, the processing circuitry 510 can include a processor 512 and, in some embodiments, such as that illustrated in FIG. 5, can further include memory 514. The processing circuitry 510 can be in communication with or otherwise control a transceiver 516 and/or handover control module 518.

The processor 512 can be embodied in a variety of forms. For example, the processor 512 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 can comprise a plurality of processors. The plurality of processors can be in operative communication with each other and can be collectively configured to perform one or more functionalities of the apparatus 500 as described herein. In some example embodiments including a plurality of processors, the plurality of processors can be distributed across a plurality of apparatuses (e.g., a plurality of network entities), which can be in operative communication with each other to provide functionality of a serving cellular network in accordance with one or more example embodiments. In some example embodiments, the processor 512 can be configured to execute instructions that can be stored in the memory 514 or that can be otherwise accessible to the processor 512. As such, whether configured by hardware or by a combination of hardware and software, the processor 512 can be capable of performing operations according to various embodiments while configured accordingly.

In some example embodiments, the memory 514 can include one or more memory devices. Memory 514 can include fixed and/or removable memory devices. In some example embodiments including a plurality of memory devices, the plurality of memory devices can be distributed across a plurality of apparatuses (e.g., a plurality of network entities), which can be in operative communication with each other to provide functionality of a serving cellular network in accordance with one or more example embodiments. In some embodiments, the memory 514 can provide a non-transitory computer-readable storage medium that can store computer program instructions that can be executed by the processor 512. In this regard, the memory 514 can be configured to store information, data, applications, instructions and/or the like for enabling the apparatus 500 to carry out various functions in accordance with one or more example embodiments. In some embodiments, the memory 514 can be in communication with one or more of the processor 512, transceiver 516, or handover control module 518 via a bus (or buses) for passing information among components of the apparatus 500.

The apparatus 500 can further include transceiver 516. The transceiver 516 can enable the apparatus 500 to send wireless signals to and receive signals from one or more wireless communication devices, such as the wireless communication device 202. As such, the transceiver 516 can be configured to support communication in accordance with any type of cellular RAT that can be implemented by a cell that can be accessed by wireless communication device 202, such as the serving RAT cell 204 and/or the alternative RAT cell 206.

The apparatus 500 can further include handover control module 518. The handover control module 518 can be embodied as various means, such as circuitry, hardware, a computer program product comprising a computer readable medium (for example, the memory 514) storing computer readable program instructions executable by a processing device (for example, the processor 512), or some combination thereof. In some embodiments, the processor 512 (or the processing circuitry 510) can include, or otherwise control the handover control module 518. The handover control module 518 can be configured in some example embodiments to make a handover decision, such as a decision to handover the wireless communication device 202 to the alternative RAT cell 206, based on a measurement report that can be sent by the wireless communication device 202. As a further example, in some embodiments, the handover control module 518 can be configured to make a handover decision, such as a decision to handover the wireless communication device 202 to the alternative RAT cell 206 based on a purpose for which a connection between the wireless communication device 202 and the serving RAT cell 204 was established, such as illustrated in and described herein below with respect to FIGS. 8-9. In some example embodiments, the handover control module 518 can additionally or alternatively be configured to make a handover decision and/or perform resource allocation based at least in part on device capabilities of the wireless communication device 202, such as described with respect to FIG. 10.

The wireless communication device 202 of some example embodiments can be configured to avoid ping pong reselections in an uplink power limited scenario by selectively determining whether to modify a downlink signal quality in a measurement based at least in part on a purpose for which a connection to a serving network was established. For example, the wireless communication device 202 of some such example embodiments can be configured to only sending a measurement report having a modified signal quality value if a connection with the serving network was established for a purpose other than or in addition to a signaling purpose (e.g., if the connection was not established only for a signaling purpose). Thus, if the wireless communication device 202 determines that it is experiencing an uplink power limited condition and a connection with the serving RAT cell 204 was established only for a signaling purpose, the wireless communication device 202 can report an actual measured downlink signal quality value for the serving RAT cell 204. For example, if the serving RAT is LTE and a connection was established for non-access stratum (NAS) signaling, such as to perform a TAU procedure, the wireless communication device 202 can send a measurement report with an actual measured downlink signal quality value rather than a modified downlink signal quality value so that the wireless communication device 202 is not redirected to another RAT, such as to alternative RAT cell 206, to avoid the potential for a ping pong reselection scenario.

Figure 6:
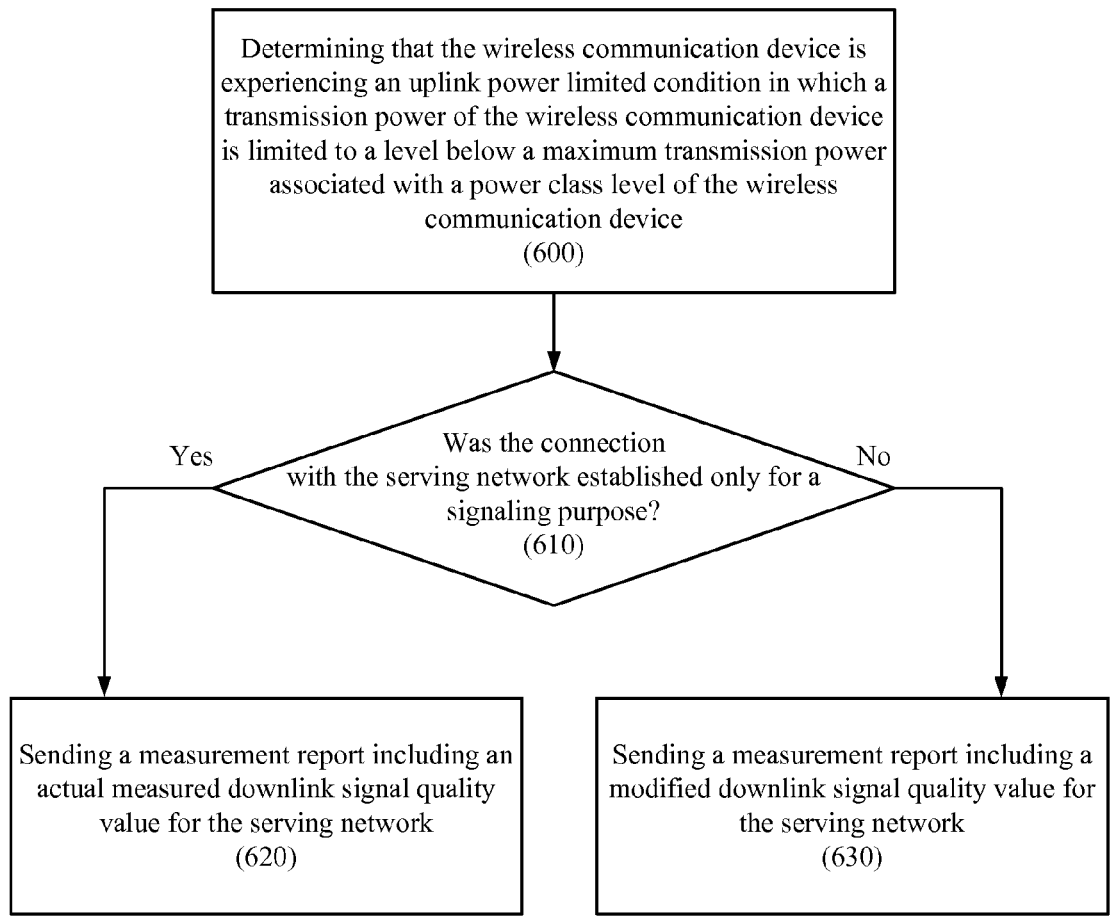
FIG. 6 illustrates a flowchart of an example method for handling an uplink power limited scenario based at least in part on a purpose for which a connection was established that can be performed by a wireless communication device in accordance with some example embodiments.

FIG. 6 illustrates a flowchart of an example method for handling an uplink power limited scenario based at least in part on a purpose for which a connection was established that can be performed by a wireless communication device, such as wireless communication device 202, in accordance with some example embodiments. One or more of processor 302, transceiver 304, memory 306, processing circuitry 410, processor 412, memory 414, transceiver 416, proximity sensor 418, or measurement module 420 can, for example, provide means for performing one or more operations illustrated in and described with respect to FIG. 6.

Operation 600 can include the wireless communication device 202 determining that the wireless communication device 202 is experiencing an uplink power limited in which a transmission power of the wireless communication device 202 is limited to a level below a maximum transmission power associated with a power class level of the wireless communication device 202. By way of non-limiting example, in some example embodiments, the determination of operation 600 can be made based at least in part on output of the proximity sensor 418. In this regard, the uplink power limited condition can be triggered in response to capping of the transmission power in response to the proximity sensor 418 detecting that the wireless communication device 202 is within a proximity of a human body for which the maximum transmission power of the wireless communication device 202 can be capped in compliance with a regulation restricting radio frequency emissions by the wireless communication device 202 when the wireless communication device 202 is within proximity of a human body.

Operation 610 can include the wireless communication device 202 determining whether the connection with the serving network (e.g., a connection with the serving RAT cell 204) was established only for a signaling purpose. For example, if a connection was established only to perform a TAU procedure, routing area update (RAU), and/or other signaling (e.g., NAS signaling) purpose, then the wireless communication device 202 can determine that the connection was established only for a signaling purpose. However, if the connection was established for a purpose other than and/or in addition to a signaling purpose, such for a service request to establish a call or data session, then the wireless communication device 202 can determine that the connection was not established only for a signaling purpose.

In an instance in which the connection was established only for a signaling purpose, the method can proceed to operation 620, which can include the wireless communication device 202 sending a measurement report including an actual measured downlink signal quality value for the serving network. Thus, for example, if the serving RAT cell 204 is an LTE cell, operation 620 can include sending a measurement report including an actually measured RSRP value for the cell.

If, however, the connection was not established only for a signaling purpose, the method can instead proceed to operation 630, which can include the wireless communication device 202 sending a measurement report including a modified downlink signal quality value for the serving network. Thus, for example, if the serving RAT cell 204 is an LTE cell, operation 620 can include sending a measurement report including a modified RSRP value for the cell. The modified downlink signal quality value may, for example, be derived by adding an offset to the actually measured downlink signal quality value to derive a modified downlink signal quality value that is less than the actually measured downlink signal quality value. The offset may, for example, be equivalent or otherwise proportional to an amount by which the wireless communication device's 202 maximum transmission power may be capped. The measurement report including a modified downlink signal quality value can be sent to trigger a handover of the wireless communication device 202. For example, if the modified downlink signal quality value satisfies a threshold for performing a handover, the measurement report can trigger a handover. In some embodiments, an interfrequency handover to another cell on the same network can be performed in response to operation 630. Additionally or alternatively, in some example embodiments, the measurement report that can be sent in operation 630 can trigger an iRAT handover to a network using a different RAT than the serving network. For example, the measurement report can trigger an iRAT handover to the alternative RAT cell 206.

Figure 7:
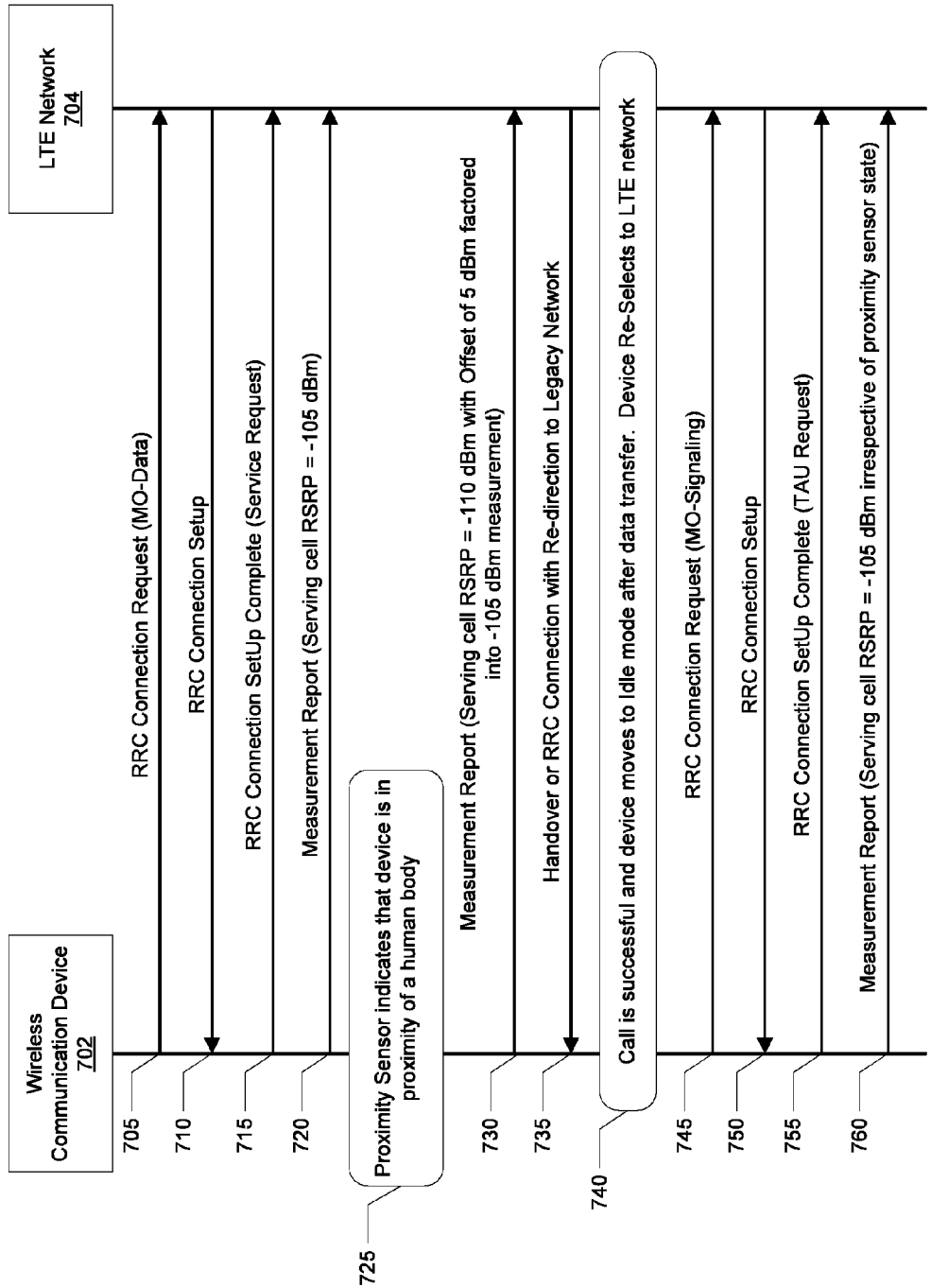
FIG. 7 illustrates a signaling diagram of signals that can be exchanged between a wireless communication device and a serving network in accordance with some example embodiments in which a wireless communication device can handle an uplink power limited scenario based at least in part on a purpose for which a connection was established.

FIG. 7 illustrates a signaling diagram of signals that can be exchanged between a wireless communication device 702 and a serving LTE network 704 in accordance with some example embodiments in which a wireless communication device can handle an uplink power limited scenario based at least in part on a purpose for which a connection was established. While FIG. 7 is illustrated and described with respect to LTE signaling, it will be appreciated that the techniques illustrated in and described with respect to FIG. 7 can be applied mutatis mutandis in the context of other RATs within the scope of the disclosure.

The wireless communication device 702 can, for example, be an embodiment of wireless communication device 202. As such, one or more of processor 302, transceiver 304, memory 306, processing circuitry 410, processor 412, memory 414, transceiver 416, proximity sensor 418, or measurement module 420 can, for example, provide means for performing one or more operations that can be performed by wireless communication device 702.

The LTE network 704 can, for example, include serving RAT cell 204. As such, one or more elements of apparatus 500, such as processing circuitry 510, processor 512, memory 514, transceiver 516, and/or handover control module 518, can, for example, provide means for performing one or more operations that can be performed by the LTE network 704.

Operation 705 can include the wireless communication device 702 sending a radio resource connection (RRC) Connection Request to the LTE network 704. The RRC Connection Request can indicate that the connection is for purpose of establishing a data session. In this regard, the RRC Connection Request can include the Mobile Originated (MO) establishment cause indicator "MO-Data." Operation 710 can include the LTE network 704 sending an RRC Connection Setup message to the wireless communication device 702 in response to the RRC Connection Request. Operation 715 can include the wireless communication device 702 sending an RRC Connection SetUp Complete message including a service request to the LTE network 704. For example, the service request can be for call establishment.

While connected to the LTE network 704, the wireless communication device 702 can measure the RSRP of the serving cell (e.g., of the serving RAT cell 204) as −105 dBm. The wireless communication device 702 may not be experiencing an uplink power limited condition and, as such, can send a measurement report indicating the actually measured serving cell RSRP value of −105 dBm, at operation 720.

After sending the measurement report of operation 720, the proximity sensor can indicate that the wireless communication device 702 is within proximity of a human body, as indicated by operation 725. The wireless communication device 702 can be configured to apply a 5 dBm offset to the actually measured RSRP value in response to an uplink power limited condition when a connection was not established only for a signaling purpose. Since the connection was established for a data session, operation 730 can include the wireless communication device 702 sending a measurement report indicating that the serving cell RSRP is −110 dBm, which can include the 5 dBm offset added to the actually measured RSRP value. −110 dBm can satisfy a handover threshold. As such, the LTE network 704 can redirect the wireless communication device 702 to a legacy network, such as a WCDMA network or GSM network, at operation 735. For example, the wireless communication device 702 can be handed over to the alternative RAT cell 206.

The call can be completed successfully on the legacy network. After termination of the call, the wireless communication device 702 can move to idle mode on the legacy network, and can reselect to the higher priority LTE network 704, as indicated by operation 740. Operation 745 can include the wireless communication device 702 sending an RRC Connection Request to the LTE network 704. The RRC Connection Request can indicate that the connection is only for purpose of signaling. In this regard, the RRC Connection Request can include the MO establishment cause indicator "MO-Signaling." Operation 750 can include the LTE network 704 sending an RRC Connection Setup message to the wireless communication device 702 in response to the RRC Connection Request of operation 745. Operation 755 can include the wireless communication device 702 sending an RRC Connection SetUp Complete message including a service request to the LTE network 704, which can include a TAU request.

After reselecting to the LTE network and establishing the connection for signaling purposes in operations 740-755, the proximity sensor of the wireless communication device 702 can, in some instances, indicate that the device is within proximity of a human body. However, as the connection was established only for a signaling purpose, the wireless communication device 702 can send a measurement report to the LTE network 704 including the actually measured serving cell RSRO (e.g., −105 dBm) irrespective of the state of the proximity sensor, at operation 760.

In some example embodiments, a serving network (e.g., serving RAT cell 204) can be configured to evaluate whether to handover a wireless communication device based at least in part on a purpose for which a connection to the serving network was established. In this regard, a serving network entity, such as a base station and/or other entity associated with serving RAT cell 204, in accordance with some example embodiments can be configured to not redirect the wireless communication device 202 to another RAT (e.g., to alternative RAT cell 206) if a connection with the wireless communication device 202 was established only for a signaling purpose, even if a measurement report received from the wireless communication device 202 satisfies a handover threshold. In some such embodiments, a serving base station, such as a base station associated with serving RAT cell 204, can be configured to determine whether a connection was established only for a signaling purpose in response to receiving a measurement report reporting a signal quality value satisfying a handover threshold, which would otherwise trigger redirection of the wireless communication device 202. If the connection was not established only for a signaling purpose (e.g., if the connection was established for a purpose other than or in addition to a signaling purpose), the serving network can initiate a handover of the wireless communication device 202 in response to receiving a measurement report reporting a signal quality value satisfying a handover threshold. However, if the connection was established only for a signaling purpose, the wireless communication device 202 can be maintained on the current serving cell (e.g., serving RAT cell 204) to avoid the possibility of ping pong reselection that might occur if a wireless communication device 202 that is experiencing an uplink power limited condition and that established a connection only for a signaling purpose (e.g., for NAS signaling) is redirected to another RAT.

Figure 8:
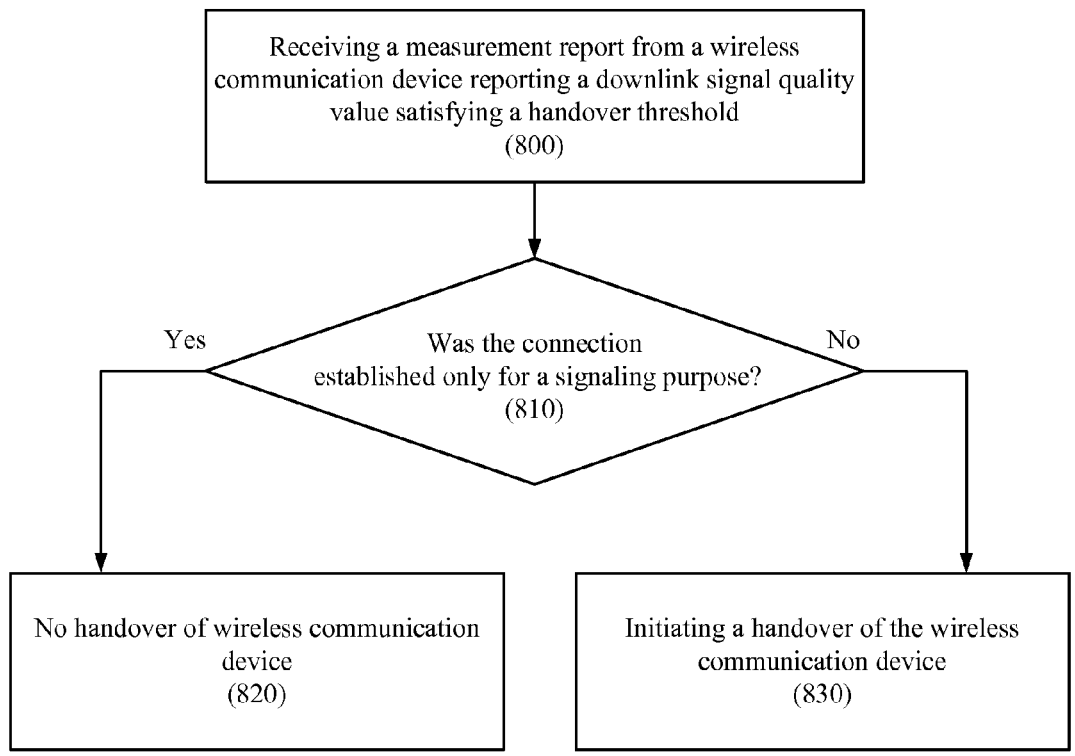
FIG. 8 illustrates a flowchart of an example method for handling an uplink power limited scenario based at least in part on a purpose for which a connection was established that can be performed by a network entity in accordance with some example embodiments.

FIG. 8 illustrates a flowchart of an example method for handling an uplink power limited scenario based at least in part on a purpose for which a connection was established that can be performed by a network entity in accordance with some example embodiments. For example, the method of FIG. 8 can be performed by a base station and/or other network entity that can be associated with the serving RAT cell 204. One or more elements of the apparatus 500, such as one or more of processing circuitry 510, processor 512, memory 514, transceiver 516, or handover control module 518, can, for example, provide means for performing one or more operations illustrated in and described with respect to FIG. 8.

Operation 800 can include receiving a measurement report from the wireless communication device 202 reporting a downlink signal quality value satisfying a handover threshold. For example, the measurement report can include an RSRP value satisfying a handover threshold.

Operation 810 can include determining whether the wireless communication device 202 established the connection only for a signaling purpose. For example, if a connection was established only to perform a TAU procedure, RAU, and/or other signaling (e.g., NAS signaling) purpose, then it can be determined that the connection was established only for a signaling purpose. However, if the connection was established for a purpose other than and/or in addition to a signaling purpose, such for a service request to establish a call or data session, then the wireless communication device 202 can determine that the connection was not established only for a signaling purpose. In some example embodiments, operation 810 can be performed based at least in part on a MO establishment cause indicator that can be included in an RRC Connection Request that can be sent by the wireless communication device 202 when establishing the connection.

In an instance in which the connection was established only for a signaling purpose, the method can proceed to operation 820, which can include the serving network determining to not handover the wireless communication device 202.

If, however, the connection was not established only for a signaling purpose, the method can instead proceed to operation 830, which can include the serving network initiating a handover of the wireless communication device 202. For example, the serving network can initiate an inter-frequency handover, iRAT handover, and/or other handover of the wireless communication device 202 to another cell. By way of non-limiting example, operation 830 can include initiating an iRAT handover through redirection of the wireless communication device 202 to the alternative RAT cell 206. However, it will be appreciated that any procedure that can be used by a network to trigger transition of a wireless communication device between cells can be used to initiate handover of the wireless communication device 202.

Figure 9:
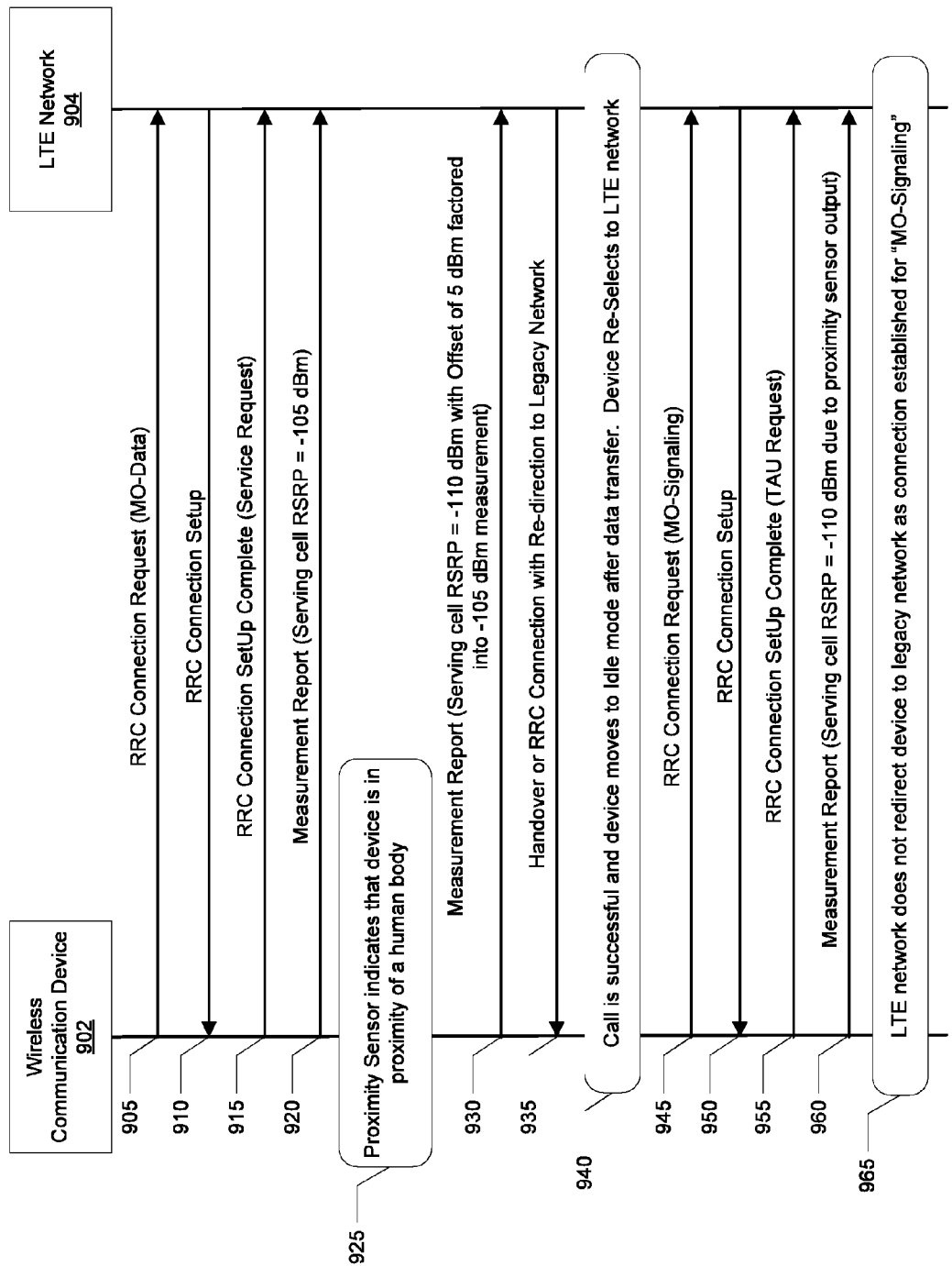
FIG. 9 illustrates a signaling diagram of signals that can be exchanged between a wireless communication device and a serving network in accordance with some example embodiments in which a network entity can handle an uplink power limited scenario based at least in part on a purpose for which a connection was established.

FIG. 9 illustrates a signaling diagram of signals that can be exchanged between a wireless communication device 902 and a serving LTE network 904 in accordance with some example embodiments in which a network entity can handle an uplink power limited scenario based at least in part on a purpose for which a connection was established. While FIG. 9 is illustrated and described with respect to LTE signaling, it will be appreciated that the techniques illustrated in and described with respect to FIG. 9 can be applied mutatis mutandis in the context of other RATs within the scope of the disclosure.

The wireless communication device 902 can, for example, be an embodiment of wireless communication device 202. As such, one or more of processor 302, transceiver 304, memory 306, processing circuitry 410, processor 412, memory 414, transceiver 416, proximity sensor 418, or measurement module 420 can, for example, provide means for performing one or more operations that can be performed by wireless communication device 902.

The LTE network 904 can, for example, include serving RAT cell 204. As such, one or more elements of apparatus 500, such as processing circuitry 510, processor 512, memory 514, transceiver 516, and/or handover control module 518, can, for example, provide means for performing one or more operations that can be performed by the LTE network 904.

Operation 905 can include the wireless communication device 902 sending an RRC Connection Request to the LTE network 904. The RRC Connection Request can indicate that the connection is for purpose of establishing a data session. In this regard, the RRC Connection Request can include the MO establishment cause indicator "MO-Data." Operation 910 can include the LTE network 904 sending an RRC Connection Setup message to the wireless communication device 902 in response to the RRC Connection Request. Operation 915 can include the wireless communication device 902 sending an RRC Connection SetUp Complete message including a service request to the LTE network 904. For example, the service request can be for call establishment.

While connected to the LTE network 904, the wireless communication device 902 can measure the RSRP of the serving cell (e.g., of the serving RAT cell 204) as −105 dBm. The wireless communication device 902 may not be experiencing an uplink power limited condition and, as such, can send a measurement report indicating the actually measured serving cell RSRP value of −105 dBm, at operation 920.

After sending the measurement report of operation 920, the proximity sensor can indicate that the wireless communication device 902 is within proximity of a human body, as indicated by operation 925. The wireless communication device 902 can be configured to apply a 5 dBm offset to the actually measured RSRP value in response to an uplink power limited condition. As such, operation 930 can include the wireless communication device 902 sending a measurement report indicating that the serving cell RSRP is −110 dBm, which can include the 5 dBm offset added to the actually measured RSRP value. −110 dBm can satisfy a handover threshold. Since the connection was established for a data session (e.g., for a purpose other than signaling), the LTE network 904 can redirect the wireless communication device 902 to a legacy network, such as a WCDMA network or GSM network, at operation 935. For example, the wireless communication device 902 can be handed over to the alternative RAT cell 206.

The call can be completed successfully on the legacy network. After termination of the call, the wireless communication device 902 can move to idle mode on the legacy network, and can reselect to the higher priority LTE network 904, as indicated by operation 940. Operation 945 can include the wireless communication device 902 sending an RRC Connection Request to the LTE network 904. The RRC Connection Request can indicate that the connection is only for purpose of signaling. In this regard, the RRC Connection Request can include the MO establishment cause indicator "MO-Signaling." Operation 950 can include the LTE network 904 sending an RRC Connection Setup message to the wireless communication device 902 in response to the RRC Connection Request of operation 945. Operation 955 can include the wireless communication device 902 sending an RRC Connection SetUp Complete message including a service request to the LTE network 904, which can include a TAU request.

After reselecting to the LTE network and establishing the connection for signaling purposes in operations 940-955, the proximity sensor of the wireless communication device 902 can continue to indicate that the device is within proximity of a human body. As such, the wireless communication device 902 can send a measurement report in operation 960 indicating that the serving cell RSRP is −110 dBm, which can include the 5 dBm offset added to the actually measured RSRP value. While the −110 dBm can satisfy a handover threshold, the LTE network 904 can determine to not redirect the wireless communication device 902 to a legacy network as the connection was established only for a signaling purpose, as illustrated by operation 965.

The wireless communication device 202 of some example embodiments can be configured to indicate its proximity sensor capability and regulation compliance information related to compliance with a SAR regulation and/or other regulation restricting radio frequency emissions by the wireless communication device when the wireless communication device is within proximity of a human body to a serving network to facilitate network handling of an uplink power limited scenario. For example, the wireless communication device 202 can include information related to proximity sensor capability and regulation compliance information in a device capabilities message, such as an RRC user equipment (UE) Capability Information message.

Figure 10:
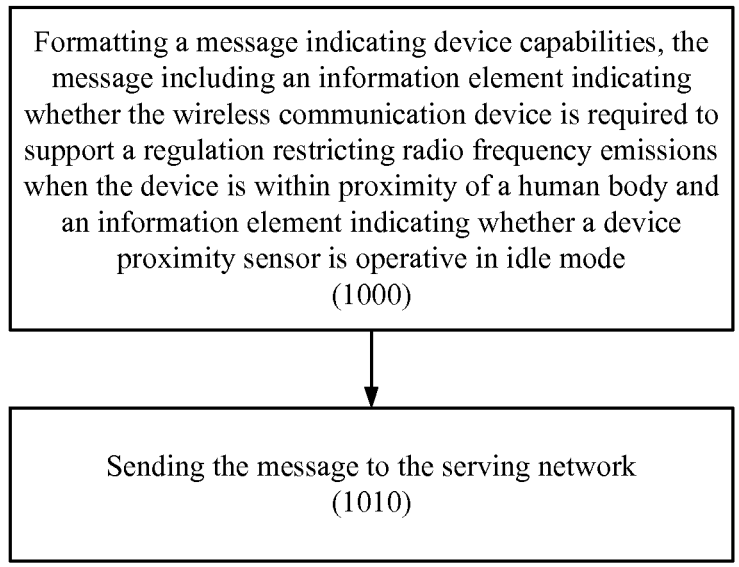
FIG. 10 illustrates a flowchart of an example method for facilitating network handling of an uplink power limited scenario based at least in part on device capabilities in accordance with some example embodiments.

FIG. 10 illustrates a flowchart of an example method for facilitating network handling of an uplink power limited scenario based at least in part on device capabilities in accordance with some example embodiments in which a wireless communication device, such as wireless communication device 202, can be configured to indicate its proximity sensor capability and regulation compliance information to a serving network. One or more of processor 302, transceiver 304, memory 306, processing circuitry 410, processor 412, memory 414, transceiver 416, proximity sensor 418, or measurement module 420 can, for example, provide means for performing one or more operations illustrated in and described with respect to FIG. 10.

Operation 1000 can include the wireless communication device 202 formatting a message indicating device capabilities. The message can include any message that can be used to provide device capabilities to the network. As a non-limiting example, the message can be an RRC UE Capability Information message that can be extended to include additional information elements.

The message can include one or more information elements including regulation compliance information. For example, the message can include an information element indicating whether the wireless communication device 202 is required to support a SAR regulation and/or other regulation restricting radio frequency emissions by the wireless communication device when the wireless communication device is within proximity of a human body. By way of non-limiting example, the information elopement can include a value, such as TRUE or FALSE to indicate whether the wireless communication device 202 is required to support such a regulation. In some example embodiments, if the wireless communication device 202 is required to support a radio frequency emission regulation, regulation compliance information that can be included in the message can additionally include one or more information elements indicating a maximum uplink power capping applied on each of one or more frequency bands that can be supported by the wireless communication device 202.

The message can additionally include one or more information elements indicating operation information for the proximity sensor 418. For example, the message can include an information element indicating whether the proximity sensor 418 is operable when the wireless communication device 202 is in idle mode. By way of non-limiting example, the information elopement can include a value, such as TRUE or FALSE, where TRUE can indicate that the proximity sensor 418 is operable in idle mode and FALSE can indicate that the proximity sensor 418 is not operable in idle mode, to indicate whether the proximity sensor 418 is operable in idle mode. In some example embodiments, the indication of whether the proximity sensor is operative in idle mode can, for example, indicate whether the proximity sensor 418 is continuously operable when the wireless communication device 202 is in idle mode.

Operation 1010 can include the wireless communication device 202 sending the message to the serving network. The serving network (e.g., a base station and/or other network entity that can be associated with the serving RAT cell 204) can be configured to manage the wireless communication device 202, such as to determine whether to proactively hand over the wireless communication device 202 in instances in which the wireless communication device 202 may be experiencing an uplink power limited condition, to perform resource allocation for the wireless communication device 202, and/or for other management purposes.

For example, if the serving network knows based on information that can be contained in the message that can be sent in operation 1010 that the wireless communication device 202 has a proximity sensor that is operative in idle mode, then the serving can know that it does not need to take any action to avoid ping pong reselection when the wireless communication device 102 is in idle mode. In this regard, the serving network can assume that the device can proactively manipulate reported downlink signal quality to trigger a handover in an instance in which the device is experiencing an uplink power limited condition and can also use the modified downlink signal quality to evaluate idle mode reselection criteria. If, however, a proximity sensor of the wireless communication device 202 is not operative in idle mode, the network can configure reselection thresholds that can be specific to the device.

As a further example, the serving network can use information that can be contained in the message for outer loop power control. In this regard, if the wireless communication device 202 is subject to uplink transmission power capping due to compliance with a SAR and/or similar regulation, the serving network can avoid allocating resources to the wireless communication device 202 that may not be usable by the wireless communication device 202.

As an additional example, if the serving network knows the amount of capping applicable to a frequency being used by the wireless communication device 202 to connect to the network (e.g., to the serving RAT cell 204), the network can configure a reduced handover threshold and/or preemptively handover the wireless communication device 202 to avoid the possibility of radio link failure that might occur due to an uplink power limited condition due to the reduction in effective cell coverage that can result from the capping.

Figure 11:
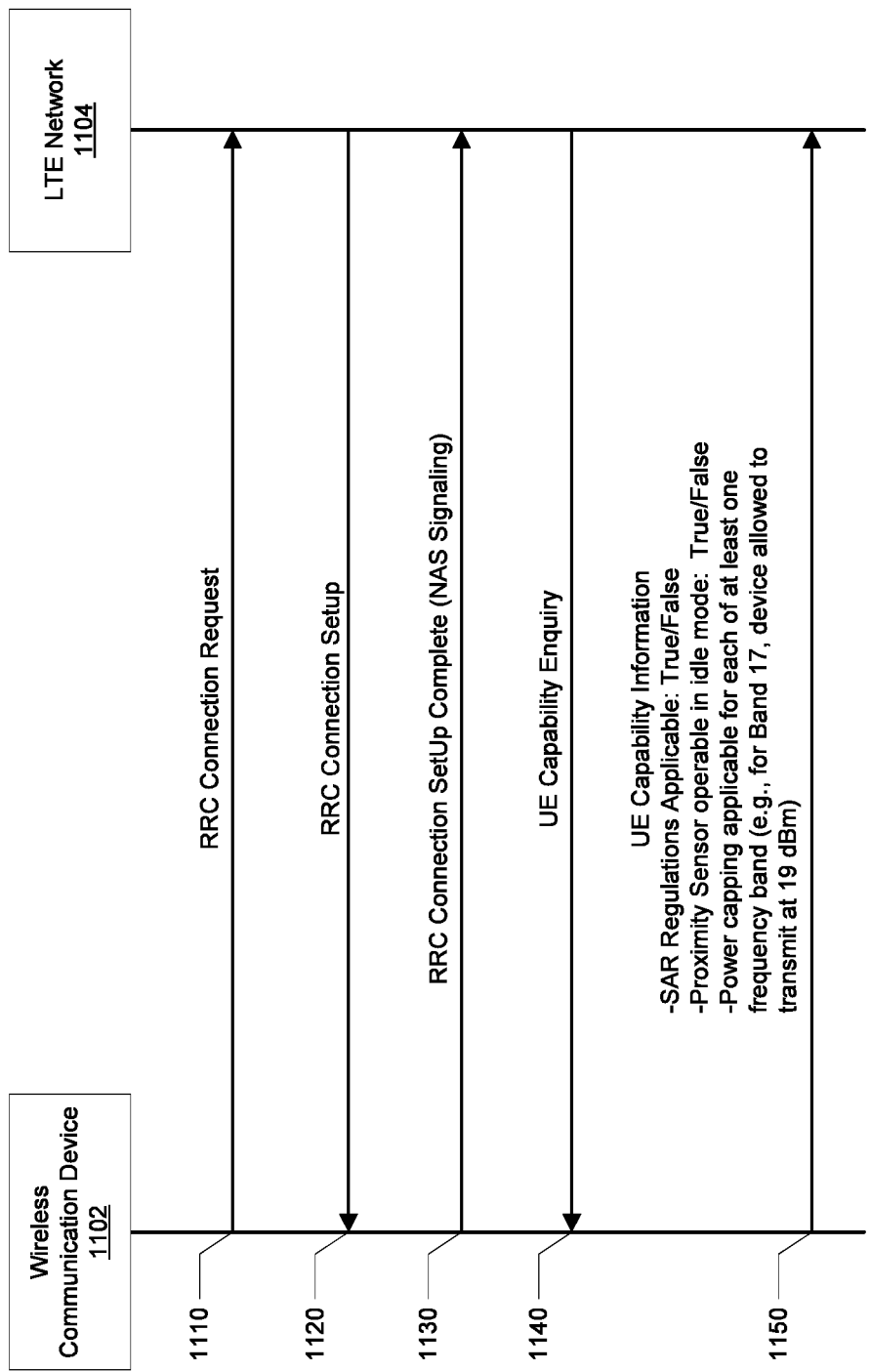
FIG. 11 illustrates a signaling diagram of signals that can be exchanged between a wireless communication device and a serving network in accordance with some example embodiments in which a network entity can handle an uplink power limited scenario based at least in part on device capabilities.

FIG. 11 illustrates a signaling diagram of signals that can be exchanged between a wireless communication device 1102 and a serving LTE network 1104 in accordance with some example embodiments in which a network entity can handle an uplink power limited scenario based at least in part on device capabilities that can be indicated by a wireless communication device. While FIG. 1 is illustrated and described with respect to LTE signaling, it will be appreciated that the techniques illustrated in and described with respect to FIG. 1 can be applied mutandis mutandis in the context of other RATs within the scope of the disclosure.

The wireless communication device 102 can, for example, be an embodiment of wireless communication device 202. As such, one or more of processor 302, transceiver 304, memory 306, processing circuitry 410, processor 412, memory 414, transceiver 416, proximity sensor 418, or measurement module 420 can, for example, provide means for performing one or more operations that can be performed by wireless communication device 1102.

The LTE network 1104 can, for example, include serving RAT cell 204. As such, one or more elements of apparatus 500, such as processing circuitry 510, processor 512, memory 514, transceiver 516, and/or handover control module 518, can, for example, provide means for performing one or more operations that can be performed by the LTE network 104.

Operation 1110 can include the wireless communication device 1102 sending an RRC Connection Request to the LTE network 1104. Operation 1120 can include the LTE network 1104 responding to the RRC Connection Request with an RRC Connection Setup message. The wireless communication device 1102 can, in turn, send an RRC Connection SetUp Complete message with NAS Signaling information to the LTE network 1104, at operation 1130.

The LTE network 1104 can send a UE Capability Enquiry to the wireless communication device 1102, at operation 1140. Operation 1150 can include the wireless communication device 1102 generating and sending a UE Capability Information message to the LTE network 1104 in response to the UE Capability Enquiry. The UE Capability Information message that can be sent in operation 1150 can, for example, correspond to an embodiment of the message that can be generated in operation 1000 and sent in operation 1010, as described above.

In the example of FIG. 11, the UE Capability Information message can include a first information element indicating whether SAR regulations are applicable to the wireless communication device 1102. For example, the information element can include a value, such as TRUE or FALSE, where TRUE can indicate that the SAR regulations are applicable to the wireless communication device 1102 and FALSE can indicate that the wireless communication device 1102 is not subject to SAR regulations.

The example UE Capability Information message of FIG. 11 can further include a second information element that can indicate whether a proximity sensor that can be implemented on the wireless communication device 1102 is operable in idle mode. By way of non-limiting example, the information elopement can include a value, such as TRUE or FALSE, where TRUE can indicate that the proximity sensor of the wireless communication device 1102 is operable in idle mode and FALSE can indicate that the proximity sensor of the wireless communication device 1102 is not operable in idle mode. In some example embodiments, the indication of whether the proximity sensor is operative in idle mode can, for example, indicate whether the proximity sensor of the wireless communication device 1102 is continuously operable when the wireless communication device 1102 is in idle mode.

In some example embodiments, the example UE Capability Information message of FIG. 11 can additionally include a third information element that can indicate a maximum power capping applicable for each of one or more frequency bands. For example, assuming by way of example that the wireless communication device 1102 is a power class 3 UE having a maximum transmission power of +23 dBm and the wireless communication device 1102 is subject to 4 dBm of capping in Band 17, the third information element can indicate that the capped transmission power for Band 17 when in proximity of a human body is +19 dBm and/or can indicate that the wireless communication device 1102 is subject to 4 dBm capping for Band 17 when proximate to a human body.

In some example embodiments, the wireless communication device 202 can be capable of sensing a proximity to a human body (e.g., a proximity between a transmission antenna of the device and a human body) even if the device is in idle mode. In this regard, in some such embodiments, the proximity sensor 418 can be operable, or even continuously operable, when the wireless communication device 202 is in idle mode. In some such embodiments, the wireless communication device 202 can be configured to use a modified downlink signal quality value, such as a modified RSRP value, to evaluate call selection criteria. For example, in some embodiments, if the wireless communication device 202 is not in an active transmission state (e.g., is in idle mode) and the proximity sensor 418 indicates the device is proximate to a human body, the wireless communication device 202 can add an "OFFSET" to q-RxLevmin for an LTE cell in S criteria check when (re)selecting to LTE. The wireless communication device 202 can be additionally or alternatively configured to add the same and/or other OFFSET value to LTE iRAT measurements when camped on a cell of a legacy RAT, such as a WCDMA cell, GSM cell, and/or other legacy RAT cell.

The OFFSET can, for example, be a value that can be configured by the network. For example, a network can broadcast the OFFSET in a system information block (SIB), such as by way of non-limiting example, SIB1, SIB 3, and/or other SIB that can be sued to configure cell selection parameters.

Alternatively, the OFFSET can be a device configured value, which can be selected by the wireless communication device 202. For example, the wireless communication device 202 can select an OFFSET value based at least in part on a maximum capping applicable for a frequency band on which the device is operating (e.g., for a frequency band associated with a the target cell for which the device can be evaluating selection criteria). In this regard, uplink transmission power capping regulations can vary by frequency. The OFFSET value can, for example, be a value proportional to an amount of capping applied for the frequency band.

Figure 12:
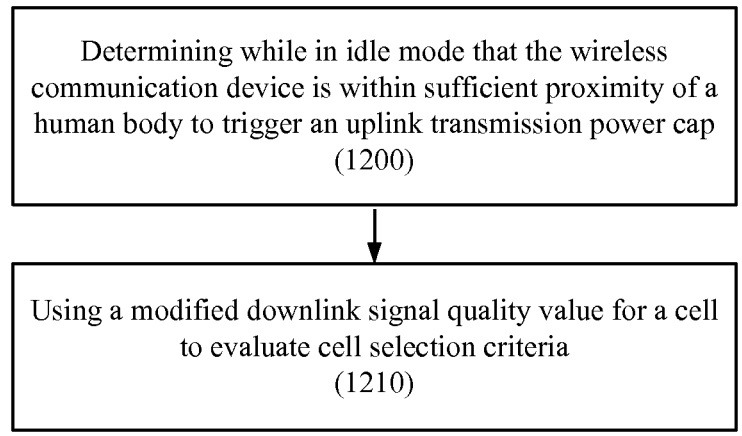
FIG. 12 illustrates a flowchart of an example method for handling an uplink power limited scenario in idle mode that can be performed by a wireless communication device in accordance with some example embodiments.

FIG. 12 illustrates a flowchart of an example method for handling an uplink power limited scenario in idle mode that can be performed by a wireless communication device 202 in accordance with some example embodiments in which the proximity sensor 418 can be operable in idle mode. One or more of processor 302, transceiver 304, memory 306, processing circuitry 410, processor 412, memory 414, transceiver 416, proximity sensor 418, or measurement module 420 can, for example, provide means for performing one or more operations illustrated in and described with respect to FIG. 12.

Operation 1200 can include the wireless communication device 202 determining, while in idle mode, that the wireless communication device 202 is within sufficient proximity of a human body to trigger an uplink transmission power cap. For example, operation 1200 can include making the determination based at least in part on output of the proximity sensor 418 while in idle mode.

Operation 1210 can include using a modified downlink signal quality value for a cell to evaluate cell selection criteria. For example, in some embodiments, operation 1210 can include adding an OFFSET to q-RxLevmin in an S criteria check, as described above.

In some example embodiments, the wireless communication device 202 may be unable to sense a proximity to a human body (e.g., a proximity between a transmission antenna of the device and a human body) if the device is in idle mode, or may at least not be able to continually sense proximity when in idle mode. In this regard, the proximity sensor 418 of some example embodiments may not be operable or may not be continuously operable when the wireless communication device 202 is in idle mode. For example, in some embodiments, the proximity sensor 418 can be deactivated for at least a portion of the time that the wireless communication device 202 is in idle mode to reduce power consumption.

In some such example embodiments in which the wireless communication device 202 is unable to sense a proximity to a human body if the device is in idle mode, the wireless communication device 202 can be configured to determine prior to entering idle mode whether the wireless communication device is within sufficient proximity of a human body to trigger an uplink transmission power cap and can use the proximity indication prior to entering idle mode to evaluate cell selection criteria when in idle mode. In this regard, if the proximity sensor 418 indicates prior to the wireless communication device 202 entering idle mode that the device is within proximity of a human body, the wireless communication device 202 of some embodiments can be configured to us a modified downlink signal quality to evaluate cell (re)selection criteria. For example, the wireless communication device 202 can add an OFFSET to an actually measured downlink signal quality in such circumstances. The OFFSET can, for example, be specified by the network, such as in a broadcast SIB, and/or can be defined by the wireless communication device 202, such as based on an applicable amount of uplink power capping as previously described.

As a more particular example, if evaluating LTE iRAT measurements while camped on a WCDMA cell and/or other legacy cell and the last proximity sensor indication prior to entering idle mode indicates the wireless communication device 202 is within sufficient proximity to trigger an uplink transmission power cap, the wireless communication device 202 of some such embodiments can apply an OFFSET on all LTE iRAT measurements while camped on the legacy cell. As a further example involving LTE iRAT procedures, the wireless communication device 202 of some such embodiments can add an OFFSET to q-RxLevmin in an S criteria check for an LTE cell if the last proximity sensor indication prior to entering idle mode indicates the wireless communication device 202 is within sufficient proximity to trigger an uplink transmission power cap.

Figure 13:
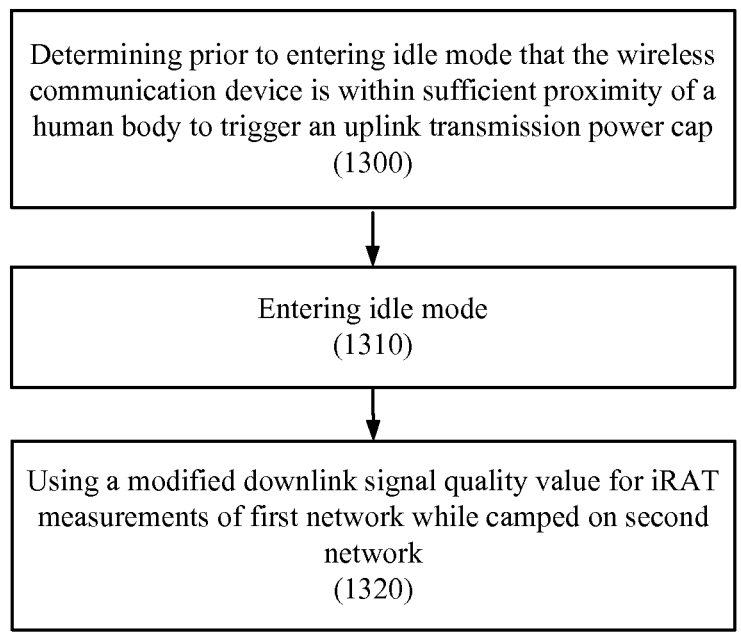
FIG. 13 illustrates a flowchart of another example method for handling an uplink power limited scenario in idle mode that can be performed by a wireless communication device in accordance with some example embodiments.

FIG. 13 illustrates a flowchart of another example method for handling an uplink power limited scenario in idle mode that can be performed by a wireless communication device that may not be capable of sensing proximity to a human body in idle mode in accordance with some such example embodiments. One or more of processor 302, transceiver 304, memory 306, processing circuitry 410, processor 412, memory 414, transceiver 416, proximity sensor 418, or measurement module 420 can, for example, provide means for performing one or more operations illustrated in and described with respect to FIG. 13.

Operation 1300 can include the wireless communication device 202 determining prior to entering idle mode that the device is within sufficient proximity of a human body to trigger an uplink transmission power cap. For example, operation 1200 can include making the determination based at least in part on output of the proximity sensor 418. Operation 1310 can include the wireless communication device 202 entering idle mode. Operation 1320 can include the wireless communication device 202 using a modified downlink signal quality value for iRAT measurements of first network while camped on second network in idle mode in response to the determination of operation 1300.

In some example embodiments, the proximity sensor 418 may be periodically and/or otherwise occasionally operable in idle mode such that, while the wireless communication device 202 may not be able to continuously determine whether it is proximate to a human body, the wireless communication device 202 can check the proximity of the device to a human body (e.g., by reading output of the proximity sensor 418) at least at one or more points in time while in idle mode. If the proximity sensor output value changes from that prior to entering idle mode to indicate that the wireless communication device 202 is no longer proximate to the human body, then the wireless communication device 202 can discontinue modification of iRAT measurements, and thus can discontinue performance of operation 1320 while in idle mode. For example, in some such embodiments, the wireless communication device 202 can discontinue addition of the OFFSET to LTE and/or other iRAT measurements in response to the output value of the proximity sensor 418 changing to indicate that the device is no longer proximate to a human body. In some example embodiments, the wireless communication device 202 can check the proximity sensor 418 during idle mode in response to detecting a new cell of an alternative RAT during iRAT measurements. For example, if the wireless communication device 202 of such embodiments is in idle mode on WCDMA and/or other legacy network and detects a new LTE cell when performing LTE iRAT measurements, the wireless communication device 202 can check the proximity sensor 418 during idle mode and can evaluate cell selection criteria based at least in part on the resulting output value of the proximity sensor 418.

Some example embodiments also address conditions in which existing wireless communication devices can have difficulties transitioning to connected mode, as due to uplink power limited conditions, the available uplink power for performing random access channel (RACH) procedures can be capped. For example, the wireless communication device 202 of some example embodiments can check the output value of the proximity sensor 418 during a connection initiation procedure for a cell, such as prior to and/or when initiating the connection. If the proximity sensor 418 indicates that that the wireless communication device 202 is within sufficient proximity of a human body to trigger an uplink transmission power cap, the wireless communication device 202 can add an OFFSET to the measured downlink signal quality when evaluating a cell section criteria, such as an S criteria check. If the S criteria check and/or other cell selection criteria check fails when factoring the OFFSET, then the wireless communication device 202 can select to not initiate a random access channel (RACH) procedure on the cell. Thus, in such embodiments, a RACH procedure can be initiated on the cell only in an instance in which the device does not experience an S criteria check failure when factoring in an OFFSET in response to the uplink power limited condition.

Figure 14:
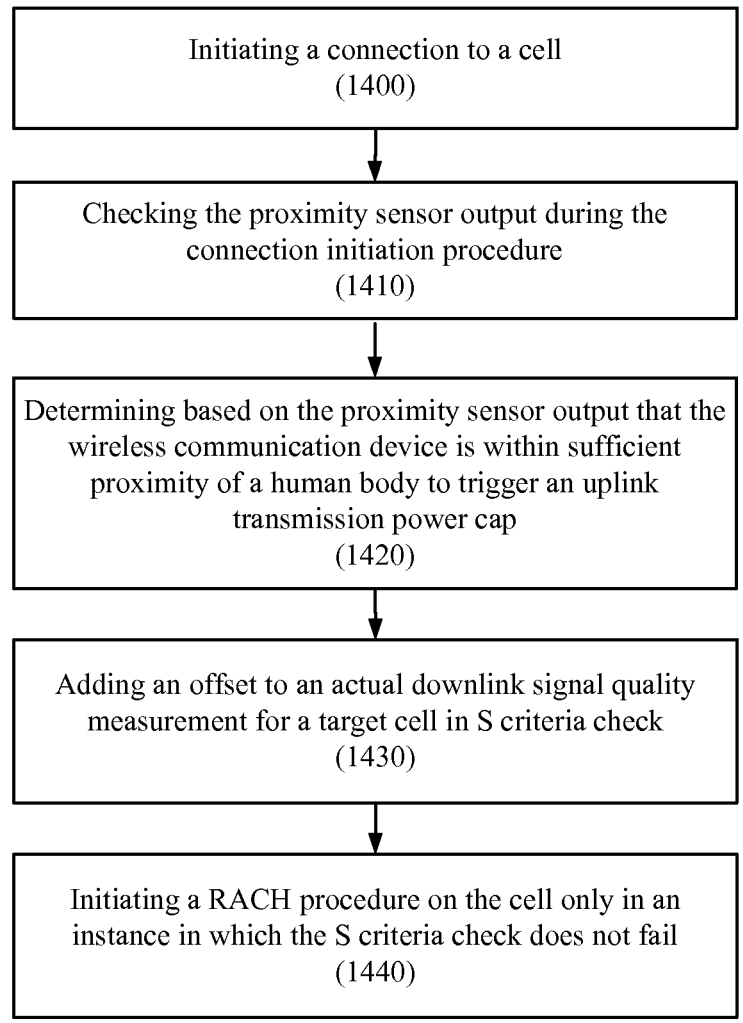
FIG. 14 illustrates a flowchart of an example method for handling an uplink power limited scenario that can be performed by a wireless communication device in accordance with some example embodiments.

FIG. 14 illustrates a flowchart of an example method for handling an uplink power limited scenario that can be performed by a wireless communication device 202 in accordance with some example embodiments in which a RACH procedure can be initiated only in an instance in which the wireless communication device does not experience an S criteria check failure when factoring in an OFFSET in response to the uplink power limited condition. One or more of processor 302, transceiver 304, memory 306, processing circuitry 410, processor 412, memory 414, transceiver 416, proximity sensor 418, or measurement module 420 can, for example, provide means for performing one or more operations illustrated in and described with respect to FIG. 14.

Operation 1400 can include the wireless communication device 202 initiating a connection to a cell. Operation 1410 can include the wireless communication device 202 checking the proximity sensor 418 output during the connection initiation procedure. Operation 1420 can include the wireless communication device 202 determining based on the proximity sensor 418 output hat the wireless communication device is within sufficient proximity of a human body to trigger an uplink transmission power cap. Operation 1430 can include the wireless communication device 202 adding an offset to an actually measured downlink signal quality measurement for a target in S criteria check. The S criteria check can accordingly be evaluated based on the modified signal quality. Operation 1440 can include the wireless communication device 202 initiating a RACH procedure on the cell only in an instance in which the S criteria check does not fail. If the S criteria check does fail, the wireless communication device 202 can omit performance of the RACH procedure and can optionally search for another target cell.

As another example, the wireless communication device 202 can be configured to address conditions in which RACH failures can occur due to uplink power limited conditions by barring a serving frequency in response to a threshold number of RACH failures occurring. For example, in some such embodiments, if the wireless communication device 202 determines (1) that it is within sufficient proximity of a human body to trigger an uplink transmission power cap (e.g., based on output of the proximity sensor 418); (2) has experienced a threshold number, N, RACH procedure failures; and (3) at least one physical random access channel (PRACH) is power limited due to the uplink transmission power cap, the wireless communication device 202 can bar a current serving frequency (e.g., a current LTE serving frequency) for a defined period of time (e.g., a threshold period of time) and search for one or more of an alternative frequency or an alternative RAT(s).

Figure 15:
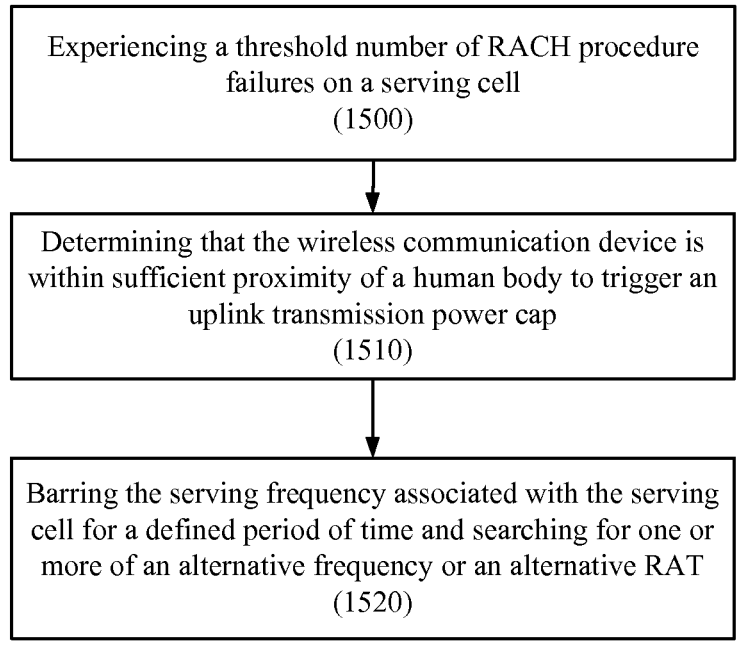
FIG. 15 illustrates a flowchart of another example method for handling an uplink power limited scenario that can be performed by a wireless communication device in accordance with some example embodiments.

FIG. 15 illustrates a flowchart of another example method for handling an uplink power limited scenario that can be performed by a wireless communication device in accordance with some such example embodiments in which a serving frequency can be barred in response to a threshold number of RACH failures. One or more of processor 302, transceiver 304, memory 306, processing circuitry 410, processor 412, memory 414, transceiver 416, proximity sensor 418, or measurement module 420 can, for example, provide means for performing one or more operations illustrated in and described with respect to FIG. 15.

Operation 1500 can include the wireless communication device 202 experiencing a threshold number of RACH procedure failures on a serving cell, such as serving RAT cell 204. Operation 1510 can include the wireless communication device 202 determining that the device is within sufficient proximity of a human body to trigger an uplink transmission power cap. For example, operation 1510 can be performed based at least in part on output of the proximity sensor 418. In some embodiments, operation 1510 can be performed prior to or during performance of the RACH procedures. Additionally or alternatively, in some example embodiments, operation 1510 can comprise checking the proximity sensor 418 in response to experiencing the threshold number of RACH procedure failures.

Operation 1520 can include the wireless communication device 202 barring the serving frequency associated with the serving cell for a defined period of time and searching for one or more of an alternative frequency or an alternative RAT in response to experiencing the threshold number of RACH procedure failures while experiencing an uplink power limited condition. In some example embodiments, operation 1520 can be further conditioned on one or more further factors, such as the wireless communication device 202 having at least one PRACH being power limited due to an uplink transmission power cap.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A wireless communication device comprising:
    at least one transceiver, the at least one transceiver configured to transmit data to and receive data from a Long Term Evolution (LTE) network using an LTE radio access technology (RAT) and a second network using a second RAT; and
    at least one processor coupled with the at least one transceiver, wherein the at least one processor is configured to cause the wireless communication device to at least:
        determine that the wireless communication device is experiencing an uplink power limited condition in which a transmission power of the wireless communication device on the LTE network is limited to a level below a maximum transmission power associated with a power class level of the wireless communication device; and
        in response to the uplink power limited condition, selectively determine whether to modify a downlink signal quality value of a measurement report based at least in part on a purpose for which a connection with the LTE network was established by at least:
            sending the measurement report including an actual measured downlink signal quality value for the LTE network in an instance in which the connection with the LTE network was established only for a signaling purpose; and
            sending the measurement report including a modified downlink signal quality value for the LTE network to trigger an inter-RAT (iRAT) handover to the second network in an instance in which the connection with the LTE network was not established only for a signaling purpose.

2. The wireless communication device of claim 1, further comprising:
    a proximity sensor configured to sense when the wireless communication device is within a proximity of a human body for which a maximum transmission power of the wireless communication device is capped in compliance with a regulation restricting radio frequency emissions by the wireless communication device when the wireless communication device is within proximity of the human body,
    wherein the uplink power limited condition is triggered in response to capping of the transmission power of the wireless communication device in compliance with the regulation based on output of the proximity sensor.

3. The wireless communication device of claim 1, wherein the uplink power limited condition is triggered in response to capping of the transmission power of the wireless communication device in compliance with a specific absorption rate (SAR) regulation.

4. The wireless communication device of claim 1, wherein the at least one processor is configured to cause the wireless communication device to send the measurement report including the modified downlink signal quality value for the LTE network at least in part by causing the wireless communication device to send the measurement report including a reference signal received power (RSRP) level that is less than an actually measured RSRP level for the LTE network.

5. The wireless communication device of claim 1, wherein the second RAT is a legacy RAT having a circuit switched domain.

6. The wireless communication device of claim 1, wherein the at least one processor is further configured to cause the wireless communication device to:
- determine while in idle mode that the wireless communication device is within sufficient proximity of a human body to trigger an uplink transmission power cap; and
- use the modified downlink signal quality value for an LTE cell on the LTE network to evaluate cell selection criteria in response to determining while in idle mode that the wireless communication device is within sufficient proximity of the human body to trigger the uplink transmission power cap.

7. The wireless communication device of claim 6, wherein the at least one processor is configured to cause the wireless communication device to use the modified downlink signal quality value for the LTE cell to evaluate cell selection criteria at least in part by causing the wireless communication device to add an OFFSET to q-RxLevmin for the LTE cell in S criteria check.

8. The wireless communication device of claim 7, wherein the OFFSET comprises a value specified in a broadcast system information block (SIB) received by the wireless communication device.

9. The wireless communication device of claim 7, wherein the OFFSET comprises a value selected by the wireless communication device based at least in part on an amount of uplink transmission power capping applicable for a frequency band associated with the LTE cell.

10. The wireless communication device of claim 1, wherein the at least one processor is further configured to cause the wireless communication device to:
- determine prior to entering idle mode that the wireless communication device is within sufficient proximity of a human body to trigger an uplink transmission power cap; and
- use the modified downlink signal quality for iRAT measurements of the LTE network while camped on the second network in idle mode in response to determining that the wireless communication device is within sufficient proximity of the human body to trigger the uplink transmission power cap prior to entering idle mode.

11. A method for handling an uplink power limited scenario, the method comprising:
- by a wireless communication device:
  - determining that the wireless communication device is experiencing an uplink power limited condition in which a transmission power of the wireless communication device on a serving network is limited to a level below a maximum transmission power associated with a power class level of the wireless communication device; and
  - in response to the uplink power limited condition, selectively determining whether to modify a downlink signal quality value of a measurement report based at least in part on a purpose for which a connection with the serving network was established by at least:
    - sending the measurement report including an actual measured downlink signal quality value for the serving network in an instance in which the connection with the serving network was established only for a signaling purpose; and
    - sending the measurement report including a modified downlink signal quality value for the serving network to trigger an inter-radio access technology (iRAT) handover to a second network in an instance in which the connection with the serving network was not established only for a signaling purpose.

12. The method of claim 11, wherein determining that the wireless communication device is experiencing the uplink power limited condition comprises determining that the wireless communication device is experiencing the uplink power limited condition based at least in part on output of a proximity sensor implemented on the wireless communication device.

13. The method of claim 11, wherein the uplink power limited condition is triggered in response to capping of the transmission power of the wireless communication device in compliance with a regulation restricting radio frequency emissions by the wireless communication device when the wireless communication device is within proximity of a human body, wherein the regulation comprises a Federal Communications Commission (FCC) issued specific absorption rate (SAR) regulation.

14. The method of claim 11, wherein:
- the serving network uses a Long Term Evolution (LTE) radio access technology (RAT); and
- sending the measurement report including the modified downlink signal quality value for the serving network comprises sending the measurement report including a reference signal received power (RSRP) level that is less than an actually measured RSRP level for the serving network.

15. The method of claim 14, wherein the second network is a wideband code division multiple access (WCDMA) network.

16. A non-transitory computer readable storage medium having computer program code stored thereon, the computer program code comprising program code, which, when executed by one or more processors implemented on a wireless communication device, is configured to cause the wireless communication device to perform a method comprising:
- determining that the wireless communication device is experiencing an uplink power limited condition in which a transmission power of the wireless communication device on a serving network is limited to a level below a maximum transmission power associated with a power class level of the wireless communication device; and
- in response to the uplink power limited condition, selectively determining whether to modify a downlink signal quality value of a measurement report based at least in part on a purpose for which a connection with the serving network was established by at least:
  - sending the measurement report including an actual measured downlink signal quality value for the serving network in an instance in which the connection with the serving network was established only for a signaling purpose; and
  - sending the measurement report including a modified downlink signal quality value for the serving network to trigger a handover in an instance in which the connection with the serving network was not established only for a signaling purpose.

17. The non-transitory computer readable storage medium of claim 16, wherein the uplink power limited condition is triggered in response to capping of the transmission power of the wireless communication device in compliance with a regulation restricting radio frequency emissions by the wireless communication device when the wireless communication device is within proximity of a human body.

18. The non-transitory computer readable storage medium of claim 16, wherein the handover comprises an inter-radio access technology (iRAT) handover to a second network.

19. A method for facilitating network handling of an uplink power limited scenario, the method comprising a wireless communication device:
- formatting a message indicating device capabilities of the wireless communication device, the message including a first information element indicating whether the wireless communication device is required to support a regulation restricting radio frequency emissions by the wireless communication device when the wireless communication device is within proximity of a human body and a second information element indicating whether a proximity sensor implemented on the wireless communication device is operative in idle mode;
- sending the message to a serving network; and
- receiving, from the serving network, a configuration for reselection thresholds or handover thresholds that is specific to the wireless communication device and is based at least in part on indicated device capabilities of the wireless communication device provided in the message sent to the serving network.

20. The method of claim 19, wherein the first information element indicates whether the wireless communication device is required to support a Specific Absorption Rate (SAR) regulation.

21. The method of claim 19, wherein formatting the message comprises formatting a Radio Resource Control (RRC) User Equipment (UE) Capability Information Message comprising the first information element and the second information element, and wherein the serving network implements a Long Term Evolution (LTE) radio access technology (RAT).

22. The method of claim 19, wherein the message further includes a third information element indicating a maximum power capping applicable for each of at least one frequency band.

23. The wireless communication device of claim 1, wherein the wireless communication device determines that the connection was established only for a signaling purpose when the connection with the LTE network was established only to perform a tracking area update (TAU) procedure, a routing area update (RAU), and/or other non-access stratum NAS signaling.

* * * * *